(12) United States Patent
Asami et al.

(10) Patent No.: US 11,784,729 B2
(45) Date of Patent: Oct. 10, 2023

(54) CALIBRATION DEVICE, CONVERSION DEVICE, CALIBRATION METHOD, AND NON-TRANSITORY COMPUTER-READABLE MEDIUM HAVING RECORDED THEREON CALIBRATION PROGRAM

(71) Applicants: ADVANTEST CORPORATION, Tokyo (JP); The University of Tokyo, Tokyo (JP)

(72) Inventors: Koji Asami, Saitama (JP); Tetsuya Iizuka, Tokyo (JP); Zolboo Byambadorj, Tokyo (JP)

(73) Assignees: ADVANTEST CORPORATION, Tokyo (JP); The University of Tokyo, Tokyo (JP)

( * ) Notice: Subject to any disclaimer, the term of this patent is extended or adjusted under 35 U.S.C. 154(b) by 0 days.

(21) Appl. No.: 17/832,667

(22) Filed: Jun. 5, 2022

(65) Prior Publication Data

US 2023/0105908 A1 Apr. 6, 2023

(30) Foreign Application Priority Data

Oct. 5, 2021 (JP) .................................. 2021-163815

(51) Int. Cl.
 *H04B 17/21* (2015.01)
 *H04B 17/40* (2015.01)
 *H04B 17/318* (2015.01)

(52) U.S. Cl.
 CPC ........... *H04B 17/21* (2015.01); *H04B 17/318* (2015.01); *H04B 17/402* (2015.01)

(58) Field of Classification Search
 CPC ........ H04B 17/00; H04B 17/21; H04B 17/22; H04B 17/318; H04B 17/336;
 (Continued)

(56) References Cited

U.S. PATENT DOCUMENTS 8,841,923 B1 9/2014 Vanwiggeren
9,985,812 B1 5/2018 Hollender
(Continued)

OTHER PUBLICATIONS

Moshe Mishali et al., "From theory to practice: Sub-nyquist sampling of sparse wideband analog signals", IEEE Journal of Selected Topics in Signal Processing, vol. 4, No. 2, pp. 375-391, Apr. 2010.
(Continued)

*Primary Examiner* — Khanh C Tran

(57) ABSTRACT

There is provided a calibration device including: a calibration signal supply unit configured to supply, as a calibration input signal, a multitone signal having tones at a plurality of frequency bands to a converter configured to multiply an input signal by each of a plurality of signal patterns and limit a band to obtain each of a plurality of bandpass signals, and reconstruct an output signal in accordance with the input signal from the plurality of bandpass signals; a calibration bandpass signal acquisition unit configured to acquire a plurality of calibration bandpass signals obtained by the converter in response to the multitone signal; and a calibration processing unit configured to calibrate a parameter for the reconstruction in the converter based on the plurality of calibration bandpass signals.

20 Claims, 27 Drawing Sheets

(58) Field of Classification Search
CPC .. H04B 17/345; H04B 17/297; H04B 17/296; H04B 17/29; H04B 17/402
See application file for complete search history.

(56) References Cited

U.S. PATENT DOCUMENTS

| | | | | |
|---|---|---|---|---|
| 2006/0262872 | A1* | 11/2006 | Green | H04L 27/364 |
| | | | | 375/350 |
| 2007/0159407 | A1* | 7/2007 | Bolle | H01Q 3/2676 |
| | | | | 342/368 |
| 2008/0070539 | A1* | 3/2008 | He | H04B 17/21 |
| | | | | 455/226.1 |
| 2010/0093282 | A1* | 4/2010 | Martikkala | H04B 17/21 |
| | | | | 455/63.4 |
| 2016/0373125 | A1* | 12/2016 | Pagnanelli | H03M 3/436 |
| 2018/0287651 | A1 | 10/2018 | Fernando | |

OTHER PUBLICATIONS

David L. Donoho, "Compressed sensing", in IEEE Transactions on Information Theory, vol. 52, No. 4, pp. 1289-1306, Apr. 2006.

Peng Wang et al., "An Improved Signal Reconstruction of Modulated Wideband Converter Using a Sensing Matrix Built upon Synchronized Modulated Signals", Circuits Syst. Signal Process. 38, 7, Jul. 2019.

Jeong Park et al., "A calibration for the modulated wideband converter using sinusoids with unknown phases", 2017 Ninth International Conference on Ubiquitous and Future Networks (ICUFN), Milan, 2017, pp. 951-955.

Laming Chen et al., "A calibration system and perturbation analysis for the Modulated Wideband Converter", IEEE 10th International Conference on Signal Processing Proceedings, Beijing, 2010, pp. 78-81.

Weisong Liu et al., "Design of a Single Channel Modulated Wideband Converter for Wideband Spectrum Sensing: Theory, Architecture and Hardware Implementation", Sensors (Basel, Switzerland) vol. 17, 5 1035.4 May. 2017.

Etgar Israeli et al., "Hardware calibration of the modulated wideband converter", 2014 IEEE Global Communications Conference, Austin, TX, 2014, pp. 948-953.

Ning Fu et al., "Successive-phase correction calibration method for modulated wideband converter system", in IET Signal Processing, vol. 13, No. 6, pp. 624-632, Aug. 2019.

Stephen Boyd, "Multitone signals with low crest factor", IEEE Trans. Circuits Syst., vol. CAS-33, No. 10, pp. 1018-1022, Oct. 1986.

Zolboo Byambadorj et al., "High-Precision Sub-Nyquist Sampling System Based on Modulated Wideband Converter forCommunication Device Testing" IEEE Transactions on Circuits and Systems?I: Regular Papers,pp. 1-11.

J.Zhang et al.,"Analysis of non-idealities of low-pass filter in random demodulator", Proc. SPIE, vol. 8759,Jan. 31, 2013, pp. 87591Q-1-87591Q-8.

P.J.Pankiewicz et al., "Sensitivity of the random demodulation framework to filter tolerances", in 2011 19th European Signal Processing Conference, 2011, pp. 534-538.

S. Smaili et al.,"Accurate and efficient modeling of random demodulation based compressive sensing systems with a general filter", in 2014 IEEE International Symposium on Circuits and Systems (ISCAS), 2014, pp. 2519-2522.

Zhao Yijiu et al.,"Model calibration for compressive sampling system with non-ideal lowpass filter", in 2015 12th IEEE International Conference on Electronic Measurement Instruments (ICEMI), vol. 02, Jul. 2015, pp. 808-812.

Y.Zhao et al., "Model calibration of non-ideal lowpass filter in modulated wideband converter for compressive sampling", Compel—the International Journal for Computation and Mathematics in Electrical and Electronic Engineering, vol. 34, pp. 941-951, 2015.

Y.Chen et al., "Modulated wideband converter with non-ideal lowpass filters", in 2010 IEEE International Conference on Acoustics, Speech and Signal Processing, 2010, pp. 3630-3633.

L-L Nguyen et al., "Digital compensation of lowpass filters imperfection in the modulated wideband converter Compressed sensing scheme for radio frequency monitoring" Signal Processing, vol. 152, pp. 292-310, 2018, [Online] http://www. sciencedirect.com/science/article/piii S0165168418302081.

L Nguyen et al.,"Implementation of modulated wideband converter compressed sensing scheme based on cots lowpass filter with amplitude and phase compensation for spectrum monitoring", in 2018 15th IEEE International Conference on Advanced Video and Signal Based Surveillance (AVSS), 2018, pp. 1-6.

* cited by examiner

CALIBRATION DEVICE, CONVERSION DEVICE, CALIBRATION METHOD, AND NON-TRANSITORY COMPUTER-READABLE MEDIUM HAVING RECORDED THEREON CALIBRATION PROGRAM

The contents of the following Japanese patent application(s) are incorporated herein by reference:
NO. 2021-163815 filed in JP on Oct. 5, 2021

BACKGROUND

1. Technical Field

The present invention relates to a calibration device, a conversion device, a calibration method, and a non-transitory computer-readable medium having recorded thereon a calibration program.

2. Related Art

Compressed sensing is a technique for sampling a narrowband signal which exists sparsely in a wide frequency band. As a converter that performs the compressed sensing, a modulated wideband converter (MWC: Modulated Wideband Converter) is known (Non-Patent Documents 1 and 2). The MWC uses a plurality of signals obtained by multiplying an input signal in a wideband, in which a narrowband signal sparsely exists, by each of a plurality of periodic sign functions (PSF: Periodic Sign Function) to sample the multiplied input signal, and reconstructs the original input signal. Non-Patent Documents 3 to 8 disclose a technique for calibrating (calibration) such an MWC. Non-Patent Documents 10 to 12 show that a signal reconstruction ability of the MWC deteriorates when a non-ideal low-pass filter is used. Non-Patent Documents 13 to 17 disclose techniques for correcting a frequency characteristic of a low-pass filter.

CITATION LIST

Non-Patent Document

Non-Patent Document 1: Mishali and Y. C. Eldar, "From theory to practice: Sub-nyquist sampling of sparse wideband analog signals", IEEE Journal of Selected Topics in Signal Processing, vol. 4, no. 2, pp. 375-391, April 2010
Non-Patent Document 2: D. L. Donoho, "Compressed sensing", in IEEE Transactions on Information Theory, vol. 52, no. 4, pp. 1289-1306, April 2006
Non-Patent Document 3: Peng Wang, Fei You, and Songbai He, "An Improved Signal Reconstruction of Modulated Wideband Converter Using a Sensing Matrix Built upon Synchronized Modulated Signals", Circuits Syst. Signal Process. 38, 7, July 2019
Non-Patent Document 4: J. Park, J. Jang and H. Lee, "A calibration for the modulated wideband converter using sinusoids with unknown phases", 2017 Ninth International Conference on Ubiquitous and Future Networks (ICUFN), Milan, 2017, pp. 951-955
Non-Patent Document 5: L. Chen, J. Jin and Y. Gu, "A calibration system and perturbation analysis for the Modulated Wideband Converter", IEEE 10th INTERNATIONAL CONFERENCE ON SIGNAL PROCESSING PROCEEDINGS, Beijing, 2010, pp. 78-81
Non-Patent Document 6: Liu, Weisong et al., "Design of a Single Channel Modulated Wideband Converter for Wideband Spectrum Sensing: Theory, Architecture and Hardware Implementation", Sensors (Basel, Switzerland) vol. 17, 5 1035.4 May 2017
Non-Patent Document 7: E. Israeli et al., "Hardware calibration of the modulated wideband converter", 2014 IEEE Global Communications Conference, Austin, Tex., 2014, pp. 948-953
Non-Patent Document 8: N. Fu, S. Jiang, L. Deng and L. Qiao, "Successive-phase correction calibration method for modulated wideband converter system", in IET Signal Processing, vol. 13, no. 6, pp. 624-632, 8 2019
Non-Patent Document 9: S. Boyd, "Multitone signals with low crest factor", IEEE Trans. Circuits Syst., vol. CAS-33, no. 10, pp. 1018-1022, Oct. 1986
Non-Patent Document 10: J. Zhang, N. Fu, W. Yu, and X. Peng, "Analysis of non-idealities of low-pass filter in random demodulator", Proc. SPIE, vol. 8759,01 2013
Non-Patent Document 11: P. J. Pankiewicz, T. Arildsen, and T. Larsen, "Sensitivity of the random demodulation framework to filter tolerances", in 2011 19th European Signal Processing Conference, 2011, pp. 534-538
Non-Patent Document 12: S. Smaili and Y. Massoud, "Accurate and efficient modeling of random demodulation based compressive sensing systems with a general filter", in 2014 IEEE International Symposium on Circuits and Systems (ISCAS), 2014, pp. 2519-2522
Non-Patent Document 13: Zhao Yijiu, Long Ling, Zhuang Xiaoyan, and Dai Zhijian, "Model calibration for compressive sampling system with non-ideal lowpass filter", in 2015 12th IEEE International Conference on Electronic Measurement Instruments (ICEMI), vol. 02, July 2015, pp. 808-812
Non-Patent Document 14: Y. Zhao, H. Wang, and Z. Dai, "Model calibration of non-ideal lowpass filter in modulated wideband converter for compressive sampling", Compel—the International Journal for Computation and Mathematics in Electrical and Electronic Engineering, vol. 34, pp. 941-951, 2015
Non-Patent Document 15: Y. Chen, M. Mishali, Y. C. Eldar, and A. O. Hero, "Modulated wideband converter with non-ideal lowpass filters", in 2010 IEEE International Conference on Acoustics, Speech and Signal Processing, 2010, pp. 3630-3633
Non-Patent Document 16: L.-L. Nguyen, R. Gautier, A. Fiche, G. Burel, and E. Radoi, "Digital compensation of lowpass filters imperfection in the modulated wideband converter compressed sensing scheme for radio frequency monitoring" Signal Processing, vol. 152, pp. 292-310, 2018, [Online] http://www.sciencedirect.com/science/article/pii/S0165168418302081
Non-Patent Document 17: L. Nguyen, A. Fiche, R. Gautier, C. Canaff, E. Radoi, and G. Burel, "Implementation of modulated wideband converter compressed sensing scheme based on cots lowpass filter with amplitude and phase compensation for spectrum monitoring", in 2018 15th IEEE International Conference on Advanced Video and Signal Based Surveillance (AVSS), 2018, pp. 1-6

DESCRIPTION OF EXEMPLARY EMBODIMENTS

Hereinafter, the invention will be described through embodiments of the invention, but the following embodiments do not limit the invention according to claims. Further, not all of the combinations of features described in the embodiments are essential for means to solve the problem in the invention.

Figure 1:
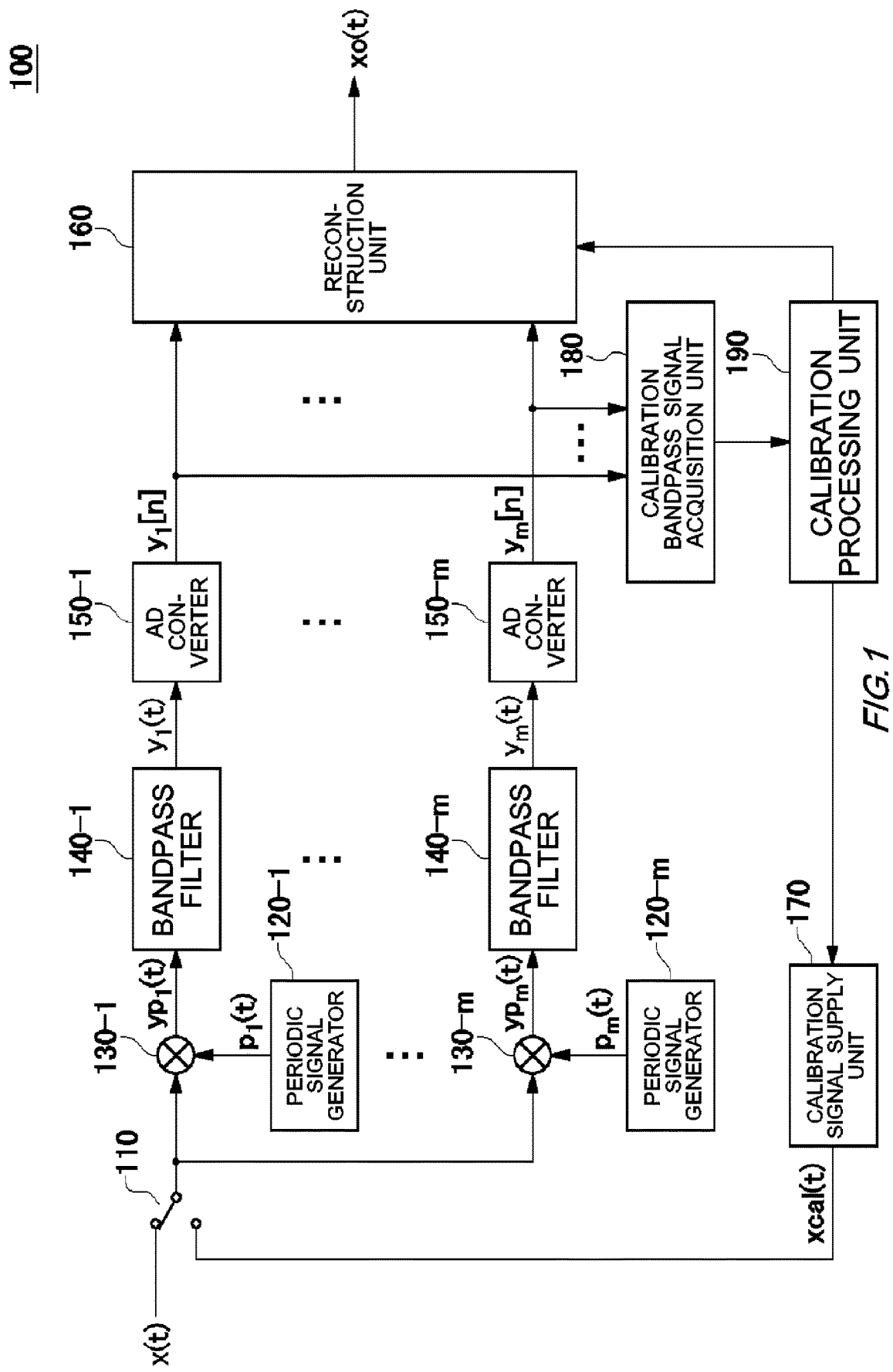
FIG. 1 shows a configuration of a conversion device according to the present embodiment.

FIG. 1 shows a configuration of a conversion device 100 according to the present embodiment. The conversion device 100 samples an analog input signal x(t) which may be a narrowband signal existing sparsely in a wide frequency band, and outputs the signal as a digital output signal xo(t). Here, t indicates a time. Further, the conversion device 100 has a function of performing calibration by using a calibration input signal xcal(t) instead of the external input signal x(t).

The conversion device 100 includes a selector 110, periodic signal generators 120-1 to m, mixers 130-1 to m, bandpass filters 140-1 to m, AD converters 150-1 to m, a reconstruction unit 160, and a calibration signal supply unit 170, a calibration bandpass signal acquisition unit 180, and a calibration processing unit 190. The periodic signal generators 120-1 to m, the mixers 130-1 to m, the bandpass filters 140-1 to m, the AD converters 150-1 to m, and the reconstruction unit 160 function as a converter that multiplies the analog input signal x(t) by each of a plurality of signal patterns $p_i(t)$ (where i is an integer, and 1≤i≤m), and limits a band to obtain each of a plurality of bandpass signals $y_i[n]$, and reconstructs the output signal xo(t) in accordance with an input signal x(t) from the plurality of bandpass signals $y_i[n]$. This converter may be an MWC.

The plurality of periodic signal generators 120-1 to m (hereinafter, also referred to as "periodic signal generators 120") respectively generate the signal patterns $p_i(t)$ which are different from each other. The signal pattern $p_i(t)$ according to the present embodiment is a periodic sign function (PSF: Periodic Sign Function) that has a predetermined period Tp, and has a positive or negative sign (for example, +1) for each section obtained by dividing the period Tp by M. Here, a repetition frequency fp (Hz) of the signal pattern is 1/Tp. Note that the plurality of periodic signal generators 120 may be configured to start the generations of the signal patterns $p_i(t)$ at the same timing by using a clock of the period Tp as a trigger.

The plurality of mixers 130-1 to m (hereinafter, also referred to as "mixers 130") are connected to the selector 110 and the plurality of periodic signal generators 120, and multiply the input signal x(t) by each of the plurality of signal patterns $p_i(t)$. Then, the plurality of mixers 130 output signals $yp_i(t)=x(t) \cdot p_i(t)$.

The plurality of bandpass filters 140-1 to m (hereinafter also referred to as "bandpass filters 140") are connected to the plurality of mixers 130, and respectively limit bands of the plurality of signals $yp_i(t)$ which are output by the plurality of mixers 130. Then, the plurality of bandpass filters 140 output a plurality of signals $y_i(t)$ obtained by limiting the bands.

The plurality of AD converters 150-1 to m (hereinafter, also referred to as "AD converters 150") are connected to the plurality of bandpass filters 140, and output the plurality of digital bandpass signals $y_i[n]$ obtained by respectively sampling the signals $y_i(t)$ that have passed through the plurality of bandpass filters 140. Here, each sampling frequency of the plurality of AD converters 150 is represented by fs (Hz). The sampling frequency fs is higher than the frequency fp of the sign of the signal pattern $p_i(t)$, for example, fs≥fp. A sign n indicates a discrete time for each sampling timing, and t=n·Ts.

The reconstruction unit 160 is connected to the plurality of AD converters 150, and reconstructs the output signal xo(t) in accordance with the input signal x(t) from the plurality of bandpass signals $y_i[n]$. Here, the output signal xo(t) is a signal obtained by converting the analog x(t) into the digital signal. Alternatively, the reconstruction unit 160 may be an analog or digital signal obtained by down-converting the analog x(t) or the like. The reconstruction unit 160 may be realized by dedicated circuitry, or may be realized by programmable circuitry. Further, the reconstruction unit 160 may be realized by executing a reconstruction program on a computer.

The selector 110, the calibration signal supply unit 170, the calibration bandpass signal acquisition unit 180, and the calibration processing unit 190 function as a calibration device that calibrates the above-described converter which converts the input signal x(t) into the output signal xo(t). Such a calibration device may be realized by dedicated circuitry, or may be realized by programmable circuitry. Further, the calibration device may be realized by executing a reconstruction program on a computer.

The selector 110 switches between inputting the external input signal x(t) to the converter, and inputting the calibration input signal xcal(t) to the converter. The selector 110 is connected to the calibration signal supply unit 170, and inputs the external input signal x(t) to the plurality of mixers 130 during a normal operation of the conversion device 100, and inputs the calibration input signal xcal(t) from the calibration signal supply unit 170 to the plurality of mixers 130 during a calibration operation of the conversion device 100.

The calibration signal supply unit 170 is connected to the calibration processing unit 190, generates the calibration input signal xcal(t) in response to an instruction from the calibration processing unit 190, and supplies the generated signal to the converter via the selector 110. Similarly to the input signal x(t), the calibration input signal xcal(t) is converted into the plurality of calibration bandpass signals $y_i[n]$ by the plurality of mixers 130, the plurality of bandpass filters 140, and the plurality of AD converters 150.

The calibration bandpass signal acquisition unit 180 is connected to the plurality of AD converters 150. The calibration bandpass signal acquisition unit 180 acquires the plurality of the calibration bandpass signals $y_i[n]$ obtained by the converter in response to the calibration input signal xcal(t).

The calibration processing unit 190 is connected to the calibration bandpass signal acquisition unit 180, and performs the calibration operation. In the calibration operation, the calibration processing unit 190 instructs the selector 110 to switch so as to supply the calibration input signal xcal(t) to the converter, and instructs the calibration signal supply unit 170 to generate the calibration input signal xcal(t). The calibration processing unit 190 calibrates a parameter for the reconstruction in the converter based on the plurality of calibration bandpass signals $y_i[n]$ acquired by the calibration bandpass signal acquisition unit 180 in response to the calibration input signal xcal(t). The calibration processing unit 190 according to the present embodiment sets or adjusts the parameter for the reconstruction which is used by the reconstruction unit 160.

Figure 2:
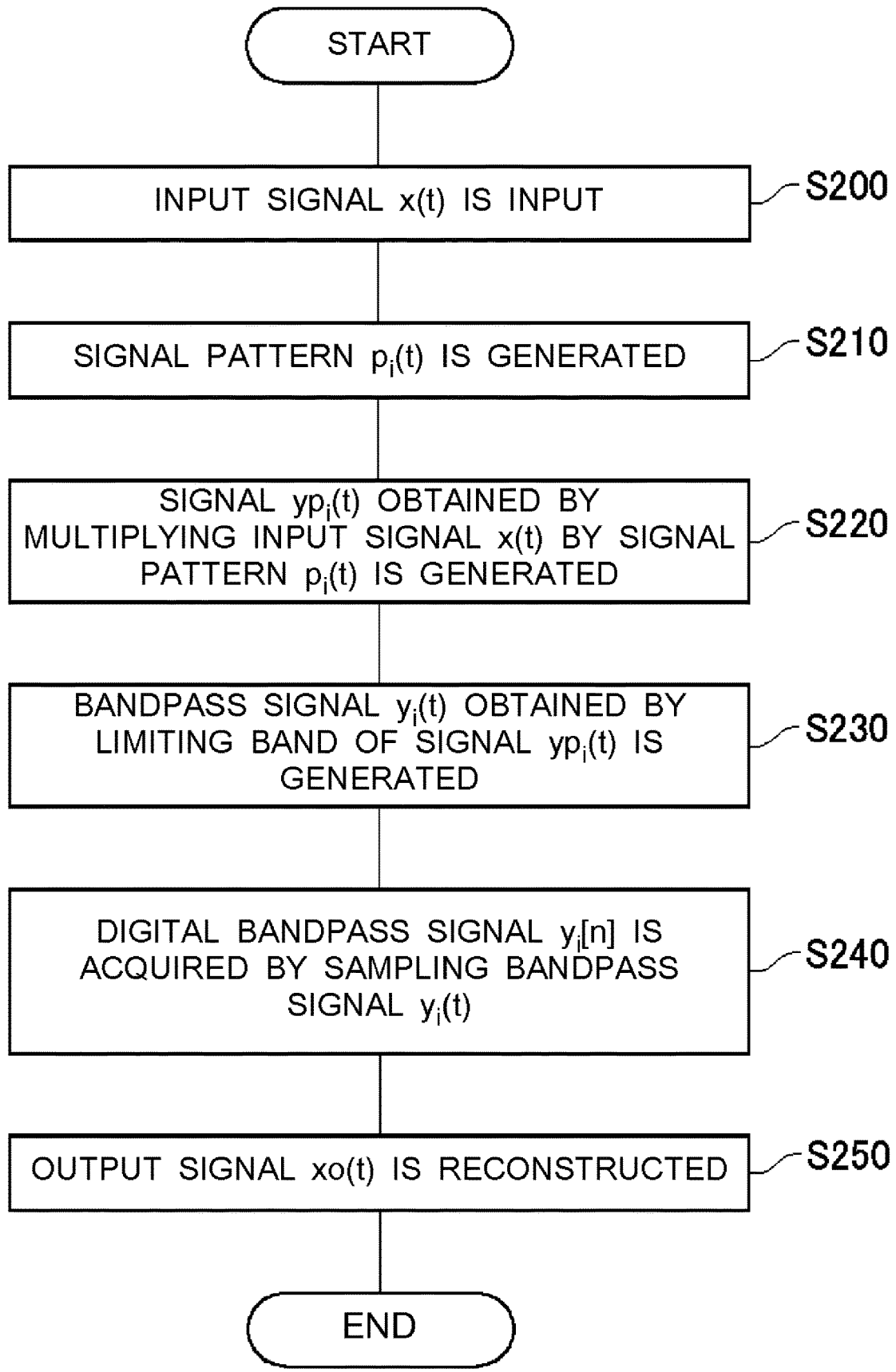
FIG. 2 shows an example of a sampling flow of the conversion device according to the present embodiment.

FIG. 2 shows an example of a sampling flow of the conversion device 100 according to the present embodiment. In step 200 (S200), the conversion device 100 inputs the input signal x(t). In the normal operation, the selector 110 supplies the input signal x(t) to the plurality of mixers 130.

In S210, the plurality of periodic signal generators 120 generate the plurality of signal patterns $p_i(t)$. In S220, the plurality of mixers 130 generate and output the plurality of signals $yp_i(t)$ obtained by multiplying the input signal x(t) by each of the plurality of signal patterns $p_i(t)$.

In S230, the plurality of bandpass filters 140 generate and output the plurality of bandpass signals $y_i(t)$ obtained by limiting the bands of the plurality of signals $yp_i(t)$. In S240, the plurality of AD converters 150 acquire the plurality of digital bandpass signals $y_i[n]$ by sampling and AD (Analog-Digital)-converting the plurality of bandpass signals $y_i(t)$.

In S250, the reconstruction unit 160 reconstructs the output signal xo(t) based on the plurality of bandpass signals $y_i[n]$. Hereinafter, the sampling operation of the conversion device 100 will be described more specifically by using FIG. 3 to FIG. 7.

Figure 3:
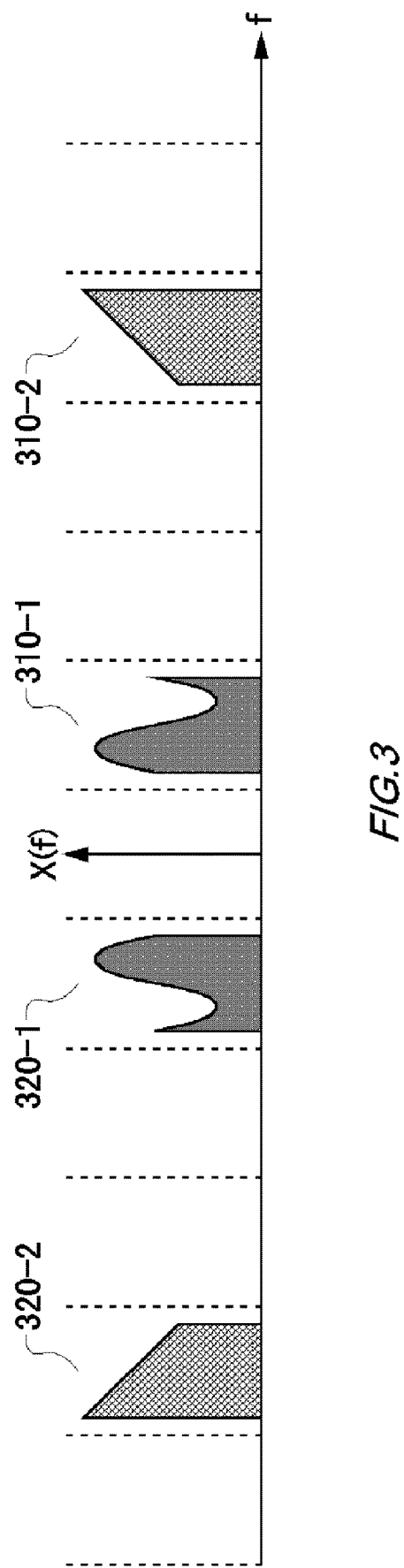
FIG. 3 shows an example of a waveform of an input signal $X(f)$ in a frequency domain.

FIG. 3 shows an example of a waveform of an input signal X(f) in a frequency domain. The input signal x(t) is a narrowband signal of 20 MHz, for example, which exists in a part of a wide frequency band of 2.4 GHz, for example. Accordingly, in the frequency domain where a horizontal axis represents a frequency, and a vertical axis represents an amplitude of each frequency component as shown in FIG. 3, the input signal x(t) is the input signal X(f) which has narrowband signals 310-1 to 2 and corresponding signals 320-1 to 2 with negative frequency components, in a part of the wide frequency band.

Figure 4:
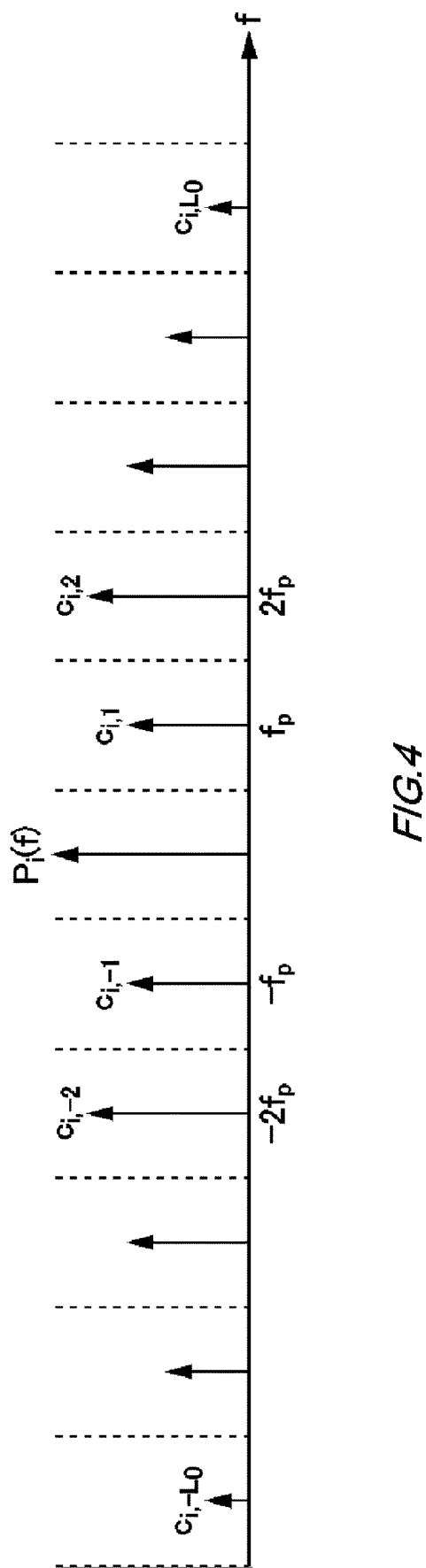
FIG. 4 shows an example of a waveform of a signal pattern $Pi(f)$ in the frequency domain.

FIG. 4 shows an example of a waveform of a signal pattern $P_i(f)$ in the frequency domain. The signal pattern $p_i(t)$ has the period Tp. Accordingly, the Fourier expansion is possible as shown in the following Expression 1.

[Expression 1]

$$p_i(t) = \sum_{l=-\infty}^{\infty} c_{i,l} e^{j\frac{2\pi}{Tp}lt} \tag{1}$$

Based on Expression 1, the signal pattern $P_i(f)$ obtained by representing the signal pattern $p_i(t)$ in the frequency domain is represented in the range of $l=-L_0$ to $L_0$ as shown in FIG. 4. Here, $c_{i,l}$ indicates a frequency component of a frequency l·fp in the signal pattern $P_i(f)$ in the frequency domain.

Figure 5:
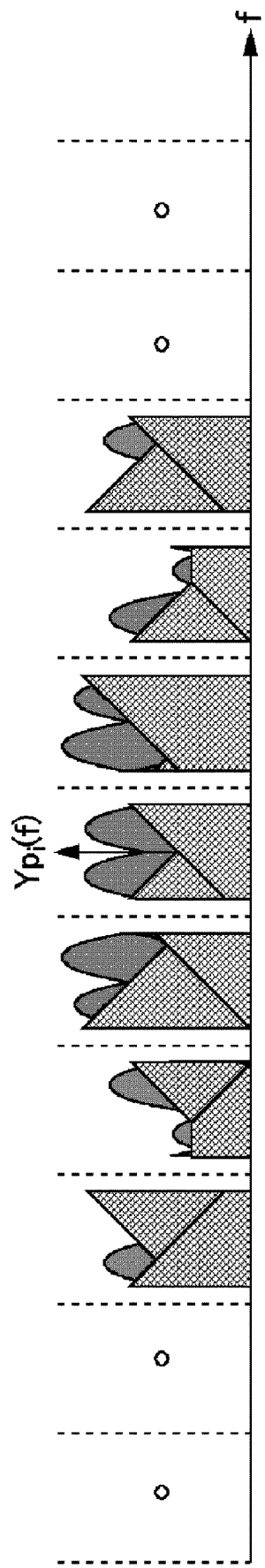
FIG. 5 shows an example of a waveform of a signal Ypi(f) obtained by multiplying the input signal and the signal pattern Pi(f) in the frequency domain.

FIG. 5 shows an example of a waveform of a signal $Yp_i(f)$ obtained by multiplying the input signal X(f) and the signal pattern $P_i(f)$ in the frequency domain. The signal $Yp_i(f)$ in the frequency domain is a signal obtained by converting the signal $yp_i(t)=x(t)\cdot p_i(t)$ in a time domain into a signal in the frequency domain, and is represented by the Fourier transform shown in the following Expression 2.

[Expression 2]

$$Yp_i(f) = \int_{-\infty}^{\infty} x(t)p_i(t)e^{-j2\pi ft} = \sum_{l=-\infty}^{\infty} c_{i,l} X(f-lfp) \tag{2}$$

Based on Expression 2, the signal $Yp_i(f)$ is a sum obtained by shifting the input signal $X(f)$ by an integer multiple lfp of fp to be weighted by each frequency component $c_{i,l}$ of $p_i(f)$ as shown in FIG. 5. In this way, the converter can frequency-convert the narrowband signal existing sparsely in the wide frequency band to the vicinity of a baseband.

Figure 6:
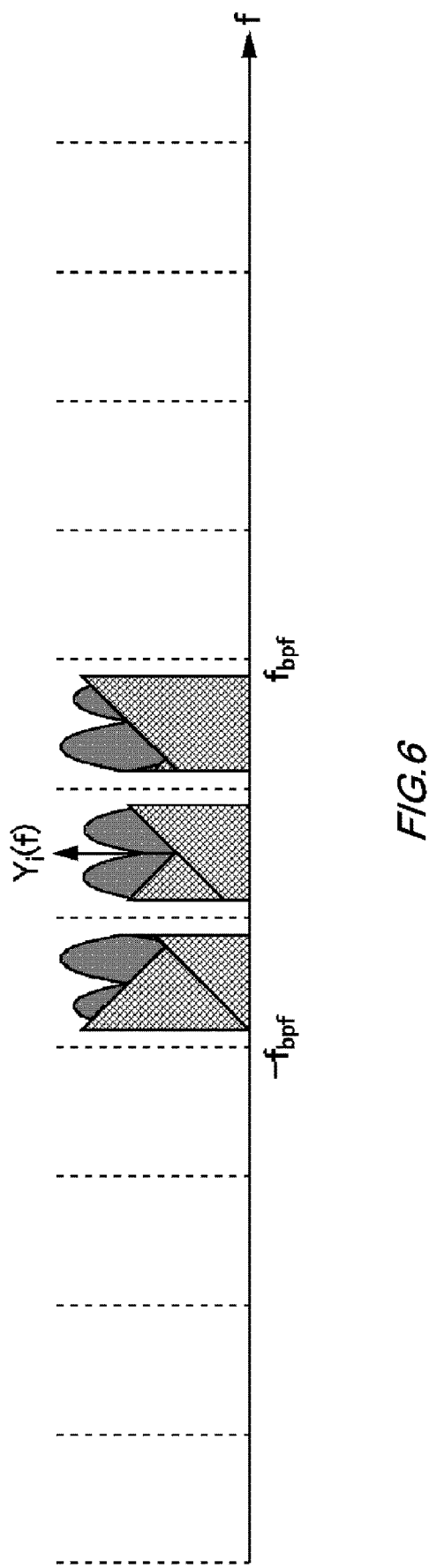
FIG. 6 shows an example of a waveform of a bandpass signal Yi(f) obtained by limiting a band of the signal, which is obtained by multiplying the input signal and the signal pattern, in the frequency domain.

FIG. 6 shows an example of a waveform of a bandpass signal $Y_i(f)$ obtained by limiting a band of the signal $Yp_i(f)$, which is obtained by multiplying the input signal $X(f)$ and the signal pattern $P_i(f)$, in the frequency domain. In the present embodiment, the bandpass filter 140 is a low-pass filter that performs low-pass filtering of passing a frequency component below a frequency $f_{bpf}$, and cuts off a frequency component with the frequency $f_{bpf}$ or higher. In this case as shown in FIG. 6, the bandpass filter 140 limits bands of a frequency component with a frequency $-f_{bpf}$ or lower and the frequency component with the frequency $f_{bpf}$ or higher in the signal $Yp_i(f)$ shown in FIG. 5, and performs the low-pass filtering of passing the frequency component above the frequency $-f_{bpf}$ and below frequency $f_{bpf}$. Here, the frequency $f_{bpf}$ may be twice or more the sampling frequency fs to realize sub-Nyquist sampling.

The bandpass signal $Y_i$ can be approximated by the discrete Fourier transform of the digital bandpass signal $y_i[n]$ as in the following Expression 3.

[Expression 3]

$$Y_i(e^{j2\pi fTs}) = \sum_{l=-\infty}^{\infty} y_i[n]e^{-j2\pi fnTs} = \sum_{l=-L_0}^{L_0} c_{i,l} X(f - lfp), -fs/2 \le f \le fs/2 \quad (3)$$

Here, $L_0$ is a positive integer selected such that all non-zero components of $X(f)$ are included in the range from $-fs/2 \le f \le fs/2$ of the bandpass signal $Y_i$. $L_0$ may be the smallest positive integer satisfying this condition.

Expression 3 can be represented in the form of a matrix-vector product shown in the following Expression 4.

[Expression 4]

$$\begin{pmatrix} Y_1(e^{j2\pi fTs}) \\ \vdots \\ Y_m(e^{j2\pi fTs}) \end{pmatrix} = \begin{pmatrix} c_{1,L_0} & \cdots & c_{1,-L_0} \\ \vdots & \ddots & \vdots \\ c_{m,-L_0} & \cdots & c_{m,-L_0} \end{pmatrix} \begin{pmatrix} X(f - L_0 fp) \\ \vdots \\ X(f + L_0 fp) \end{pmatrix} \quad (4)$$

Figure 7:
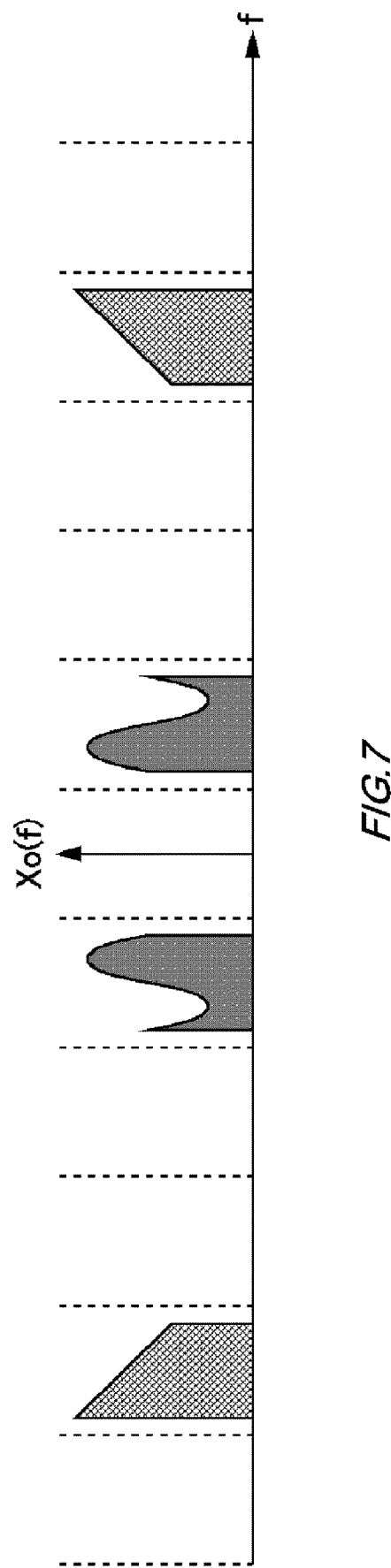
FIG. 7 shows an example of a waveform of an output signal Xo(f) reconstructed from bandpass signals Yi(f) in the frequency domain.

FIG. 7 shows an example of a waveform of an output signal $Xo(f)$ reconstructed from bandpass signals $Y_i(f)$ in the frequency domain. When a matrix of $c_{i,l}$ in Expression 4 is represented as A, a matrix A has m rows and $2L_0+1$ columns, and $2L_0+1$ is much greater than m, and thus it is difficult to uniquely calculate a vector of $X(f-lfp)$ on the right side from a vector of $Y_i$ on the left side. However, when the input signal $X(f)$ is sufficiently sparse, most of $X(f-lfp)$ on the right side is 0, and it is possible to uniquely calculate the vector of $X(f-lfp)$ on the right side from the vector of $Y_i$ on the left side by using a plurality of parameters $c_{i,l}$ included in the matrix A.

By such a principle, the reconstruction unit 160 converts each of the plurality of bandpass signals $y_i[n]$ into the bandpass signal $Y_i(f)$ in the frequency domain, uses the parameter for the reconstruction calculated from each frequency component $c_{i,l}$ of the signal pattern shown in FIG. 4 to reconstruct the output signal $Xo(f)$ in the frequency domain as shown in FIG. 3 from the plurality of bandpass signals $Y_i(f)$ in the frequency domain, and inversely converts the output signal $Xo(f)$ in the frequency domain into the output signal $xo(t)$ in the time domain, and thus it is possible to obtain the output signal $xo(t)$. Here, the reconstruction unit 160 may output the output signal $xo(t)$ in the form of a digital discrete time signal $xo[n]$.

Note that in the above description, an example of reconstructing $Xo(f)$ in the frequency domain from the bandpass signals $Y_i(f)$ in the frequency domain is shown. Alternatively, the conversion device 100 can also reconstruct the output signal $xo(t)$ in the time domain from the bandpass signals $y_i[n]$ in the time domain by using a calculation in the time domain equivalent to the above-described calculation in the frequency domain.

Further, in the above description, the case where each bandpass filter 140 is the low-pass filter is shown. However, the above-described processing can be similarly performed as long as bandpass filtering can be performed on signals in a frequency range sufficient to reconstruct the output signal $xo(t)$, and thus each bandpass filter 140 may be a bandpass filter.

With the conversion device 100 shown above, it is possible to sample the narrowband signal in such a wide frequency band including the frequency $-L_0 fp$ to the frequency $L_0 fp$ by using the plurality of AD converters 150 having the sampling frequency fs much smaller than the frequency $L_0 fp$. This makes it possible for the conversion device 100 to sample, for example, a narrowband signal of 20 MHz existing sparsely in a frequency band of several GHz to several tens of GHz by using the plurality of AD converters 150 having a sampling frequency of 80 MHz.

Figure 8:
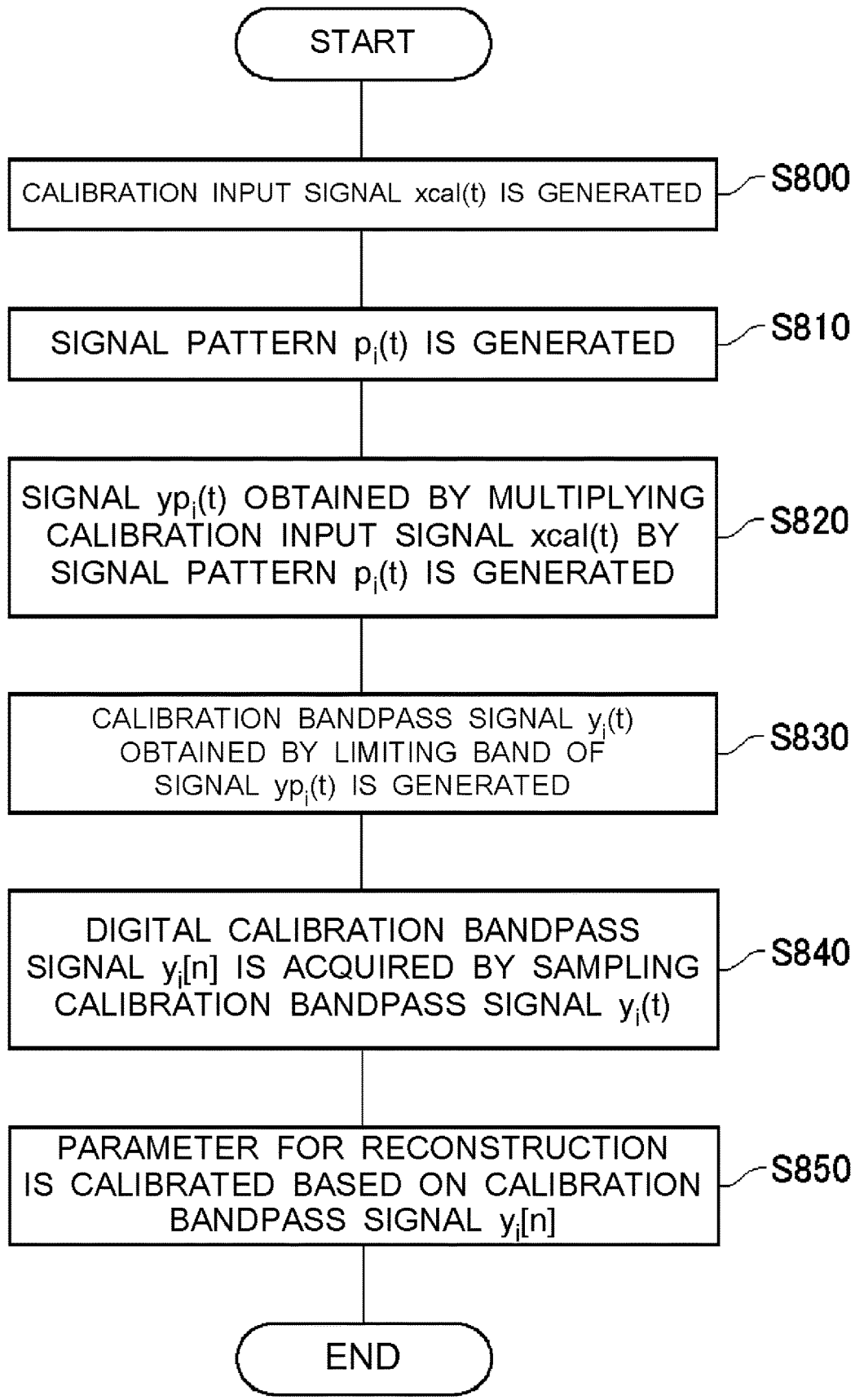
FIG. 8 shows an example of a calibration flow of the conversion device according to the present embodiment.

FIG. 8 shows an example of a calibration flow of the conversion device according to the present embodiment. In S800, the calibration signal supply unit 170 generates the calibration input signal $xcal(t)$ in response to the instruction from the calibration processing unit 190 to start the calibration operation. In the calibration operation, the selector 110 supplies the calibration input signal $xcal(t)$ to the plurality of mixers 130.

In S810, the plurality of periodic signal generators 120 generate the plurality of signal patterns $p_i(t)$, similarly to S210 during the normal operation. In S820, the plurality of mixers 130 generate and output the plurality of signals $yp_i(t)$ obtained by multiplying the calibration input signal $xcal(t)$ by each of the plurality of signal patterns $p_i(t)$, similarly to S220 during the normal operation.

In S830, the plurality of bandpass filters 140 generate and output the plurality of calibration bandpass signals $y_i(t)$ obtained by limiting the bands of the plurality of signals $yp_i(t)$, similarly to S230 during the normal operation. In S840, the plurality of AD converters 150 output the plurality of digital calibration bandpass signals $y_i[n]$ by sampling and AD-converting the plurality of calibration bandpass signals $y_i(t)$, similarly to S240 during the normal operation. The calibration bandpass signal acquisition unit 180 acquires the plurality of the calibration bandpass signals $y_i[n]$ output by the plurality of AD converters 150.

In S850, the calibration processing unit 190 calibrates the parameter for the reconstruction used by the reconstruction unit 160 based on the plurality of calibration bandpass signals $y_i[n]$. Hereinafter, the calibration operation of the conversion device 100 will be described more specifically by using FIG. 9.

Figure 9:
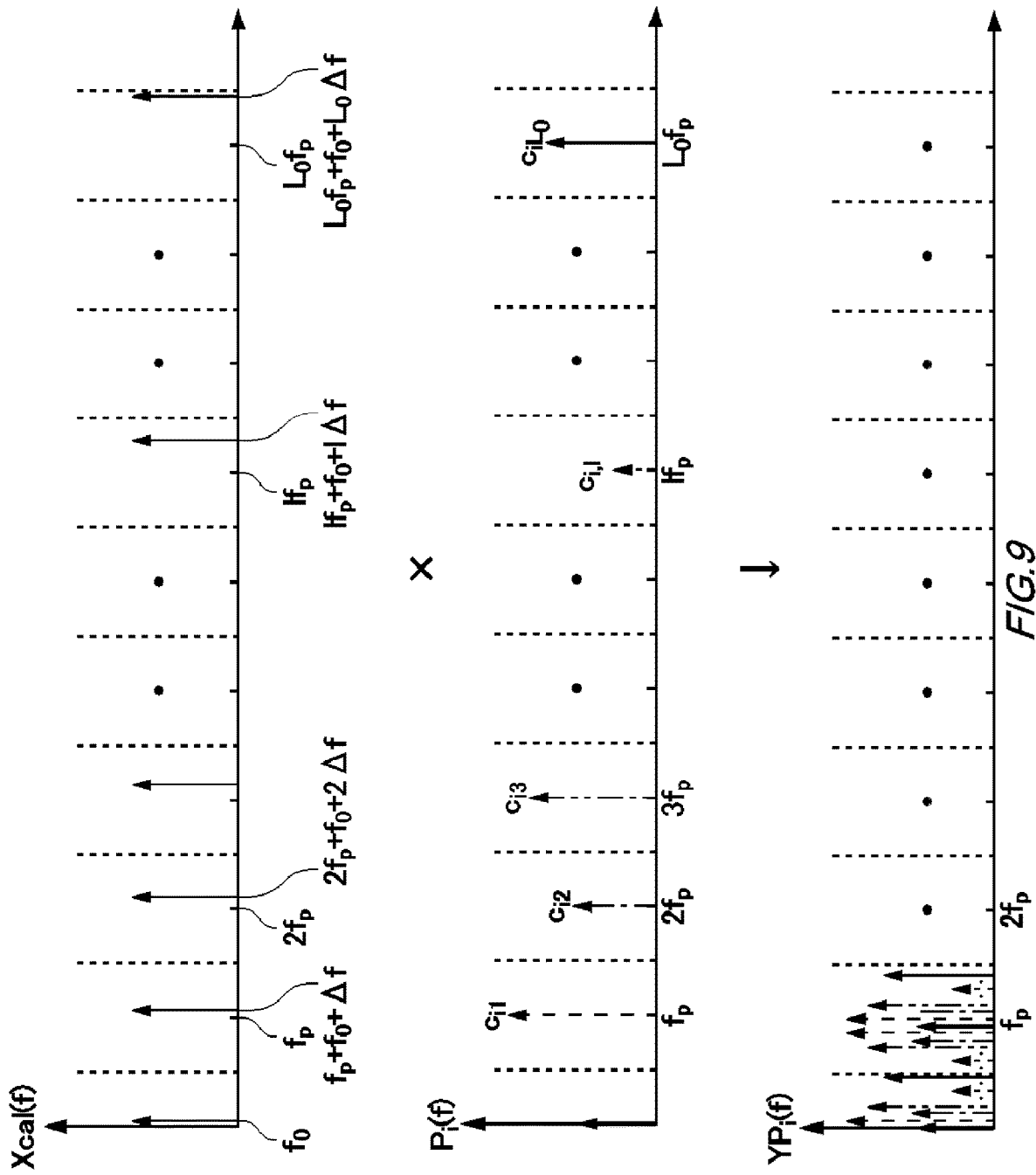
FIG. 9 shows an example of the waveform of the signal Ypi(f) obtained by multiplying a calibration input signal Xcal(f) and the signal pattern Pi(f) in the frequency domain.

FIG. 9 shows an example of the waveform of the signal $Yp_i(f)$ obtained by multiplying a calibration input signal $Xcal(f)$ and the signal pattern $P_i(f)$ in the frequency domain. As shown in relation to FIG. 1 to FIG. 7, ideally, the conversion device 100 can correctly reconstruct the output signal xo(t) in accordance with input signal x(t) if given the frequency component $c_{i,l}$ of each signal pattern $p_i(t)$ that is an element of the matrix A. However, in reality, the conversion device 100 is very sensitive and is greatly affected by characteristics of components that are actually used, characteristics of wiring, and the like. Accordingly, in order to correctly reconstruct the output signal xo(t), it is necessary to calibrate the conversion device 100.

Non-Patent Documents 3 to 8 disclose a technique for calibrating the parameter for the reconstruction by using a single tone calibration signal to sweep the frequency domain. However, in such a technique, it takes time to calculate all the parameters for the reconstruction from measurement results obtained by using single tone calibration signals generated at different timings. Further, since the single tone calibration signal is generated at each of the plurality of timings different from each other, there is a possibility of being affected by a phase shift due to random jitter in which these calibration signals are superimposed at the start timing, or the like, and there is a possibility that the parameter for the reconstruction cannot be set with high precision.

In contrast to this, as illustrated in a frequency spectrum in the upper part of FIG. 9, the calibration signal supply unit 170 according to the present embodiment supplies, as the calibration input signal xcal(t), a multitone signal having tones in a plurality of frequency bands to the converter.

The calibration input signal xcal(t) may have a tone in each of the plurality of frequency bands which centers the frequency l·fp that is the integer multiple l of the repetition frequency fp of the plurality of signal patterns $p_i(t)$, and has a width of the repetition frequency fp, the plurality of frequency bands being different from each other. The mixer 130 multiplies such a calibration input signal xcal(t) by the signal pattern $p_i(t)$ to be capable of frequency-converting the frequency components $c_{i,l}$, which are different from each other in signal pattern $p_i(t)$, to the vicinity of the baseband. As a result, the bandpass filter 140 causes the frequency components $c_{i,l}$ different from each other to be passed, and the AD converter 150 can sample the bandpass signal $y_i[n]$ including the frequency components $c_{i,l}$ different from each other.

The calibration input signal xcal(t) may have the tones in the plurality of frequency bands obtained by dividing the frequency range as a detection target in the input signal x(t) by each repetition frequency fp. When the frequency range as the detection target is 0 to $(L_0+1/2)fp$, the calibration input signal xcal(t) may have the tone in each frequency band which is obtained by dividing the frequency range as the detection target in the input signal x(t) by each repetition frequency fp, and which centers the frequency l·fp (l=0 to $L_0$), as shown in the upper part of FIG. 9. Alternatively, the calibration input signal xcal(t) may have a tone in each of the frequency bands corresponding to at least two l's.

Here, the tones in two different frequency bands among the plurality of frequency bands as described above may have a frequency difference offset from the integer multiple of the repetition frequency fp. By providing such a frequency difference between the two tones, and as a result of multiplying the calibration input signal xcal(t) by the signal pattern $p_i(t)$, the bandpass filter 140 can cause the frequency components $c_{i,l}$, which are different from each other in signal pattern $p_i(t)$, to be frequency-converted to a position shifted by this frequency difference in the vicinity of the baseband. This makes it possible for the calibration processing unit 190 to separate and detect the frequency components $c_{i,l}$, different from each other.

When a fundamental frequency is $f_0$, a repetition frequency is fp, an offset frequency is $\Delta f$, and l is an integer, the calibration input signal xcal(t) shown in FIG. 9 has a tone with a frequency of $f_0+l·fp+l\Delta f$ in the frequency range as the detection target. Such a calibration input signal xcal(t) has a frequency difference of $fp+\Delta f$ between a tone in a certain frequency band, and a tone in a high frequency band adjacent to the certain frequency band. Here, the fundamental frequency $f_0$ may be $-1/2fp \leq f_0 \leq 1/2fp$, and the offset frequency $\Delta f$ may be a positive or negative frequency such that all the tones do not deviate from a corresponding frequency band.

In a case where the $\Delta f$ is set as a positive micro frequency, when the calibration input signal xcal(t) is multiplied by the signal pattern $p_i(t)$, the frequency components $c_{i,l}$ (l=0 to $L_0$) of each frequency l·fp of the signal pattern $P_i(f)$ in the frequency domain is compressed and arrayed in the same arrangement on a frequency axis in the vicinity of the baseband, so that the bandpass signal $Yp_i(f)$ is obtained as shown in the lower part of FIG. 9. Accordingly, the calibration processing unit 190 can detect the frequency component $c_{i,l}$ in order of frequency, from the bandpass signal $Yp_i(f)$ in the frequency domain. Note that when the $\Delta f$ is set as a negative micro frequency, the frequency component $c_{i,l}$ in the bandpass signal $Yp_i(f)$ is arranged in a reversed manner.

Note that in addition to the calibration input signal xcal(t) shown in FIG. 9, the calibration input signal xcal(t) may have a tone with a frequency of $f_0+l·fp+q\Delta f$ in the frequency range as the detection target. Here, q may be an integer selected without duplication so as to satisfy $0 \leq q \leq L_0$ in the plurality of frequency bands, or may be an integer randomly selected under this condition.

In this way, in an i-th front end with the periodic signal generator 120-i, the mixer 130-i, the bandpass filter 140-i, and the AD converter 150-i, the conversion device 100 can acquire the plurality of frequency components $c_{i,l}$ (l=0 to $L_0$) of $P_i(f)$ from the bandpass signal $y_i[n]$ acquired in response to the multitone calibration input signal xcal(t). Accordingly, the calibration processing unit 190 can collectively calibrate the plurality of parameters for the reconstruction corresponding to the plurality of frequency components $c_{i,l}$.

Further, in two or more or all of the front end, the conversion device 100 can acquire the plurality of frequency components $c_{i,l}$ (l=0 to $L_0$) of $P_i(f)$ from the bandpass signals $y_i[n]$ acquired in response to the multitone calibration input signals xcal(t) which are supplied at the same timing. For two or more or all of i's in this case, the calibration processing unit 190 can collectively calibrate the plurality of the parameters for the reconstruction or all of the parameters for the reconstruction corresponding to the plurality of frequency components $c_{i,l}$.

Here, the plurality of frequency components $c_{i,l}$, which are acquired in response to the multitone calibration input signals xcal(t) which are supplied at the same timing, are not affected by the random jitter which occurs when the calibration input signals xcal(t) are supplied at different timings. Accordingly, the calibration processing unit 190 can calibrate the parameter for the reconstruction in the reconstruction unit 160 with high precision.

Note that in the above description, the simple case where each tone of the calibration input signal xcal(t) has an amplitude of 1 and a phase of 0 has been described as an example. When each tone has at least one of an amplitude which is not 1, or a phase which is not 0, each frequency component in the bandpass signal $Yp_i(f)$ is a product of the corresponding tone of the calibration input signal X(f) in the frequency domain, and the corresponding frequency component $c_{i,j}$ of the signal pattern $P_i(f)$ in the frequency domain. Accordingly, by dividing each frequency component in the bandpass signal $Yp_i(f)$ by the frequency component of the corresponding tone in the calibration input signal $X(f)$, the calibration processing unit 190 can calculate the corresponding frequency component of the signal pattern $P_i(f)$.

Figure 10:
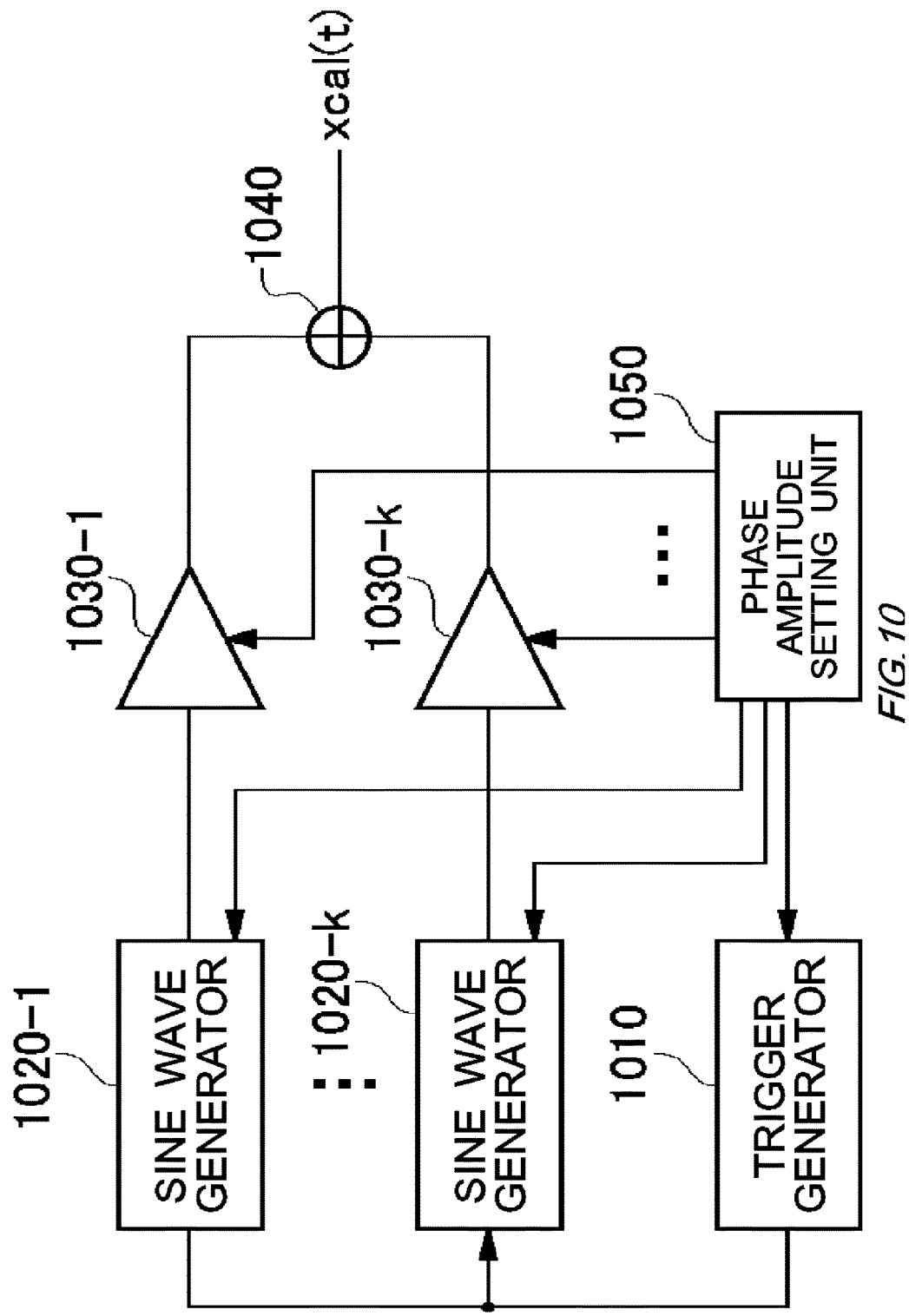
FIG. 10 shows a configuration of a calibration signal supply unit according to the present embodiment.

FIG. 10 shows a configuration of a calibration signal supply unit 1000 according to the present embodiment. The calibration signal supply unit 1000 may be used as the calibration signal supply unit 170 of FIG. 1, or may have a configuration different from that of the calibration signal supply unit 170 of FIG. 1.

The calibration signal supply unit 1000 includes a trigger generator 1010, a plurality of sine wave generators 1020-1 to k, a plurality of attenuators 1030-1 to k, a multiplexer 1040, and a phase amplitude setting unit 1050. The trigger generator 1010 generates the trigger indicating the start timing of the calibration input signal xcal(t). The trigger generator 1010 may periodically generate the calibration input signal xcal(t) by periodically generating the trigger.

The plurality of sine wave generators 1020-1 to k (also referred to as "sine wave generators 1020") are connected to the trigger generator 1010, and generate each tone to be included in the calibration input signal xcal(t). For example, the sine wave generator 1020-1 generates a tone with the frequency $f_0$ in FIG. 9, the sine wave generator 1020-2 generates a tone with a frequency of $fp+f_0+\Delta f$, . . . , and the sine wave generator 1020-k generates a tone with a frequency of $L_0 fp+f_0+L_0 \Delta f$. In this case, k is $L_0+1$. Here, each tone is a sine wave signal having a single frequency.

In the present embodiment, each sine wave generator 1020 receives, from the phase amplitude setting unit 1050, an instruction concerning the initial phase to output the tone, and outputs the tone having the initial phase specified with respect to the trigger. As the instruction concerning the initial phase to output the tone, each sine wave generator 1020 may receive an instruction concerning a delay time of the start timing of the tone with respect to a trigger.

The plurality of attenuators 1030-1 to k (also referred to as "attenuators 1030") are connected to the plurality of sine wave generators 1020, and respectively amplify or attenuate the amplitudes of the tones output by the corresponding sine wave generators 1020 according to weights specified by the phase amplitude setting unit 1050. Thereby, each attenuator 1030 outputs the tone obtained by multiplying the tone from the corresponding sine wave generator 1020 by the weight specified by the phase amplitude setting unit 1050.

The multiplexer 1040 is connected to the plurality of attenuators 1030. The multiplexer 1040 synthesizes (that is, adds) the tones which are output by the plurality of attenuators 1030, and in which at least either the amplitudes or the phases are adjusted, and outputs the synthesized tone as the calibration input signal xcal(t).

The phase amplitude setting unit 1050 instructs each sine wave generator 1020 on the initial phase of the tone to be output by each sine wave generator 1020. Further, the phase amplitude setting unit 1050 instructs each attenuator 1030 on the weight to be multiplied by the tone by each attenuator 1030. Thereby, the phase amplitude setting unit 1050 keeps a maximum amplitude of the calibration input signal xcal(t) within a rated range of the converter by performing at least one of shifting the initial phases of the plurality of tones, or adjusting the amplitudes of the plurality of tones.

More specifically, in order to correctly operate the converter including the plurality of mixers 130, the plurality of bandpass filters 140, and the plurality of AD converters 150, the calibration signal supply unit 1000 according to the present embodiment limits the amplitude of the calibration input signal within a rated range of the converter. Here, as the calibration signal supply unit 1000 supplies a synthesized wave of the plurality of tones to the converter as the calibration input signal, when peaks of a large number of tones are generated at the same time, the maximum amplitude of the synthesized wave is large. Therefore, the phase amplitude setting unit 1050 adjusts the initial phase on which the plurality of sine wave generators 1020 is instructed such that the peaks of the plurality of tones are shifted. Here, the phase amplitude setting unit 1050 may store a set of initial phases specified in advance by a manufacturer, a user, or the like of the conversion device 100 to set the stored initial phase for each sine wave generator 1020. Alternatively, the phase amplitude setting unit 1050 may calculate the maximum amplitude of the synthesized wave in accordance with the initial phases of the plurality of tones by a numerical calculation, a simulation, or the like to adjust the initial phase of each tone such that the amplitude of the synthesized wave is minimized. The phase amplitude setting unit 1050 may also keep the maximum amplitude of the calibration input signal xcal(t) within the rated range of the converter by setting the amplitudes of the plurality of tones to be substantially the same, and setting the phases of the plurality of tones to the Neuman phase described in Non-Patent Document 9.

Further, the multiplexer 1040 may limit the amplitude of the calibration input signal within the rated range of the converter by specifying the weight of the tone which is output, for each of the plurality of attenuators 1030, by the corresponding sine wave generator 1020. The phase amplitude setting unit 1050 may uniformly change the amplitudes of the plurality of tones, or may adjust each tone such that the amplitudes of at least two tones are different. Here, the phase amplitude setting unit 1050 may store a set of weights specified in advance by a manufacturer, a user, or the like of the conversion device 100 to set the stored weight for each attenuator 1030. Alternatively, the phase amplitude setting unit 1050 may calculate the maximum amplitude of the synthesized wave in accordance with the amplitudes of the plurality of tones by a numerical calculation, a simulation, or the like to make the adjustment such that the amplitude of the synthesized wave is minimized. For example, at a timing when the synthesized wave has the maximum amplitude, the phase amplitude setting unit 1050 may adjust the amplitude of the tone, which greatly contributes to an increase in the amplitude of the synthesized wave, to be smaller. The phase amplitude setting unit 1050 may adjust the initial phase of each tone and the amplitude of each tone in combination to keep the maximum amplitude of the synthesized wave within the rated range of the converter.

In the above description, when the conversion device 100 excludes any of the plurality of frequency bands from a measurement target, the calibration signal supply unit 1000 may have a configuration which does not include a set of the sine wave generator 1020 and the attenuator 1030 corresponding to the frequency band. Note that a method, in which instead of some or all of the plurality of sine wave generators 1020 and the plurality of attenuators 1030, a computer generates the synthesized wave of some or all of the corresponding tones by using a calculation by program processing, and a DA converter or an arbitrary waveform generator (AWG: Arbitrary Waveform Generator) analog-converts and outputs the generated synthesized wave, may be used.

Figure 11:
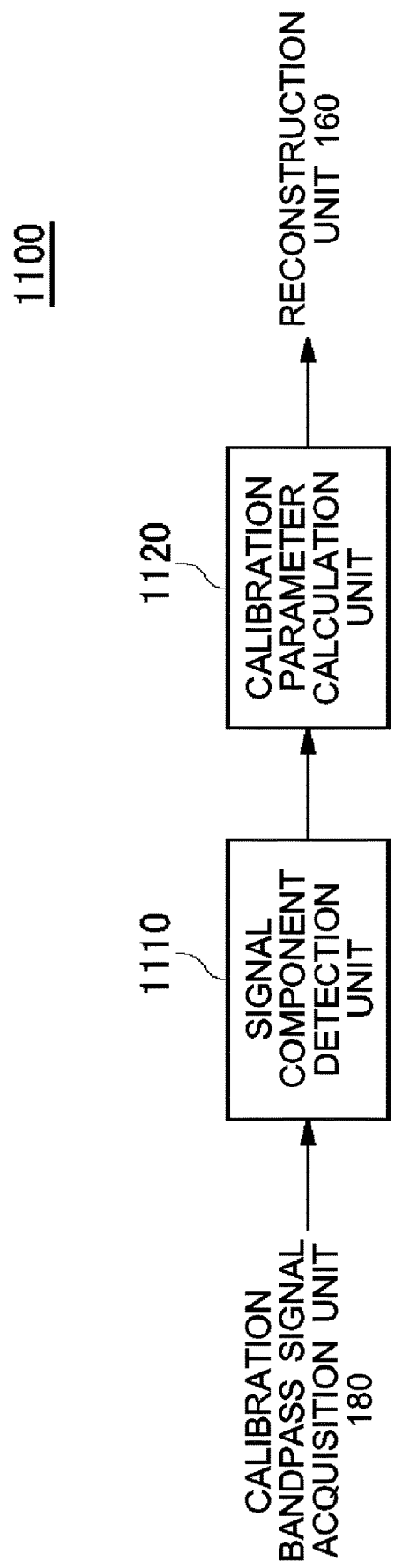
FIG. 11 shows a configuration of a calibration processing unit according to the present embodiment.

FIG. 11 shows a configuration of a calibration processing unit 1100 according to the present embodiment. The calibration processing unit 1100 may be used as the calibration processing unit 190 of FIG. 1, or may have a configuration different from that of the calibration processing unit 190 of FIG. 1.

The calibration processing unit 1100 has a signal component detection unit 1110 and a calibration parameter calculation unit 1120. The signal component detection unit 1110 is connected to a calibration bandpass signal acquisition unit such as the calibration bandpass signal acquisition unit 180, and detects, from each of the plurality of bandpass signals $y_i[n]$, each frequency component $c_{i,J}$ included in the corresponding signal pattern $p_i(t)$. The signal component detection unit 1110 according to the present embodiment converts each of the plurality of bandpass signals $y_i[n]$ into the bandpass signal $Y_i(f)$ in the frequency domain by the discrete Fourier transform (refer to Expression 3). Then, the signal component detection unit 1110 extracts the frequency component corresponding to each frequency component $c_{i,J}$ included in the signal pattern $p_i(t)$ from the bandpass signal $Y_i(f)$ in the frequency domain. Here, the calibration input signal xcal(t) is known, and thus the signal component detection unit 1110 can back calculate, from each of the extracted frequency components, the amplitude and the initial phase of each frequency component $c_{i,J}$ included in the signal pattern $p_i(t)$.

The calibration parameter calculation unit 1120 is connected to the signal component detection unit 1110, and uses each frequency component $c_{i,J}$ to calculate the parameter for the reconstruction which is for calculating a signal of each frequency band of an output signal $X(f)$ in the frequency domain (that is, the vector of X (f–lfp) on the right side of Expression 4) from the plurality of bandpass signals $Y_i(f)$ in the frequency domain (that is, the vector on the left side of Expression 4). Here, the output signal $X(f)$ in the frequency domain is sufficiently sparse, and thus if the frequency band in which there is no signal for the output signal $X(f)$ is known, it is possible to delete, from the Expression 4, $X(f-lfp)$ corresponding to that frequency band, and a column of the matrix A corresponding to that $X(f-lfp)$. Then, the calibration parameter calculation unit 1120 calculates a generalized inverse (denoted as B) of such a degenerate matrix A to set the generalized inverse as the parameter for the reconstruction. It is possible for the reconstruction unit 160 to use the parameter for the reconstruction obtained in this way, to convert the plurality of bandpass signals $y_i[n]$ in accordance with the input signal x(t) into the plurality of bandpass signals $Y_i(f)$ in the frequency domain by the discrete Fourier transform, and to obtain the plurality of signals $X(f-lfp)$ included in the output signal $X(f)$ by multiplying the vectors of the plurality of bandpass signals $Y_i(f)$ by the matrix B.

Alternatively, the calibration parameter calculation unit 1120 may supply each frequency component $c_{i,J}$ to the reconstruction unit 160 as the parameter for the reconstruction. In this case, from a value of each frequency component $c_{i,J}$ which is the parameter for the reconstruction, the reconstruction unit 160 may calculate the generalized inverse B, and then calculate the output signal $X(f)$.

Here, when the frequency band in which there is no signal for the output signal $X(f)$ is unknown, the reconstruction unit 160 may detect a frequency band in which there is a signal for the output signal $X(f)$, and then perform the above-described processing. As an example, the reconstruction unit 160 may reconstruct the output signal $X(f)$ by using the method described in Non-Patent Document 1.

Note that the calibration processing unit 1100 according to the present embodiment calculates the parameter for the reconstruction by using the calculation in the frequency domain. Alternatively, the calibration processing unit 1100 may calculate the parameter for the reconstruction by using a calculation in the time domain corresponding to the calculation in the frequency domain described above.

Figure 12:
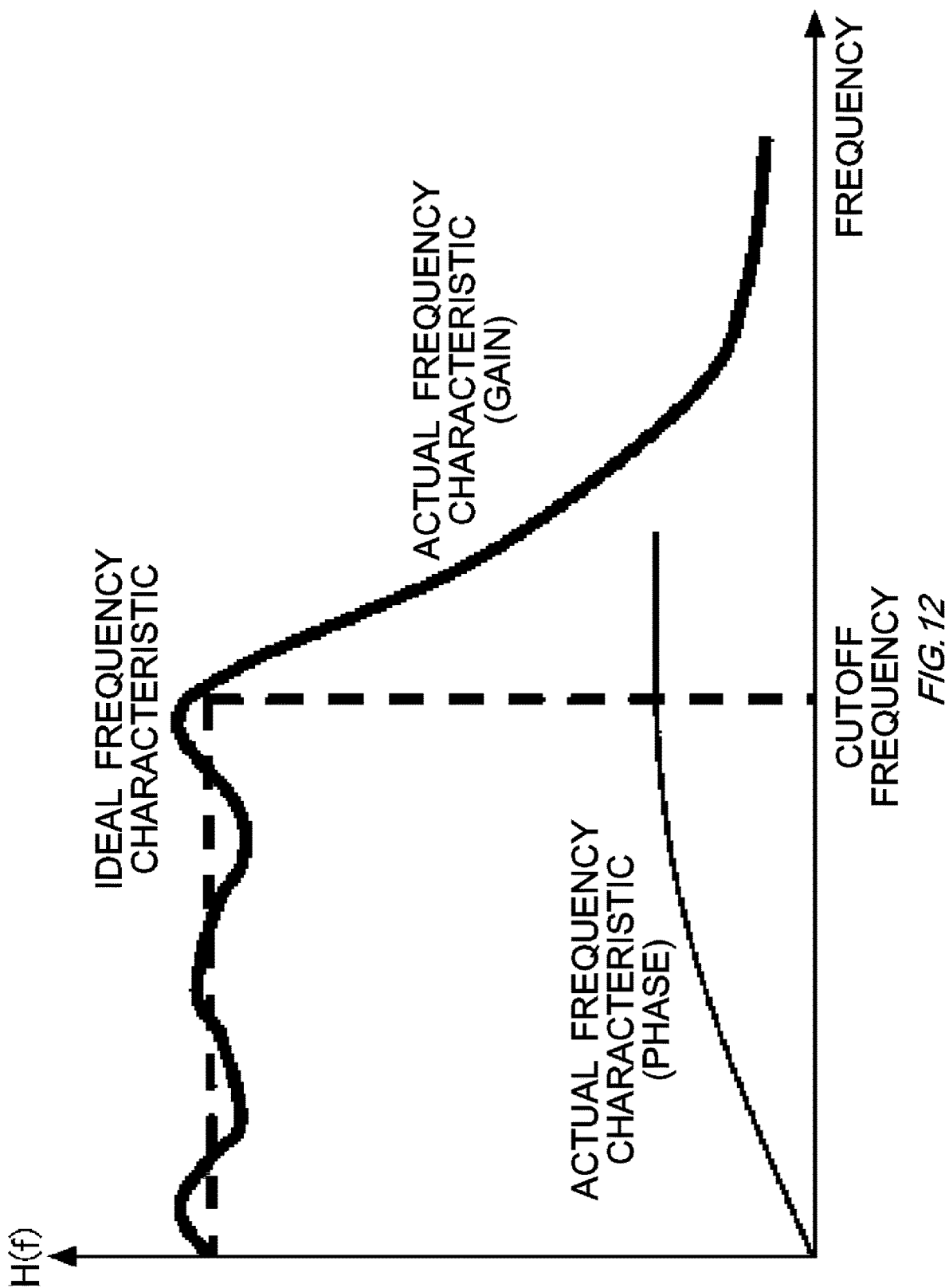
FIG. 12 shows examples of an ideal frequency characteristic and an actual frequency characteristic of a low-pass filter.

FIG. 12 shows examples of an ideal frequency characteristic and an actual frequency characteristic of a low-pass filter that is used as the bandpass filter 140. In a graph of the present drawing, the horizontal axis represents the frequency and the vertical axis represents a frequency characteristic H(f). Ideally, it is desirable that the low-pass filter has a constant gain (for example, a gain of 1.0) below a cutoff frequency ($f_{bpf}$) as shown by the dashed line and the gain is 0 at a cutoff frequency or higher. However, the low-pass filter that is used as the bandpass filter 140 is an analog circuit, and thus has a gain characteristic that the gain actually changes according to the frequency below the cutoff frequency as shown by a thick solid line and the gain gently decreases also at the cutoff frequency or higher, or the like.

Further, ideally, it is desirable for the low-pass filter to have a constant phase characteristic without depending on the frequency. However, the low-pass filter that is used as the bandpass filter 140 actually has a phase characteristic that a phase changes according to the frequency or the like due to an influence of a group delay or the like, as shown by a thin solid line.

Figure 13:
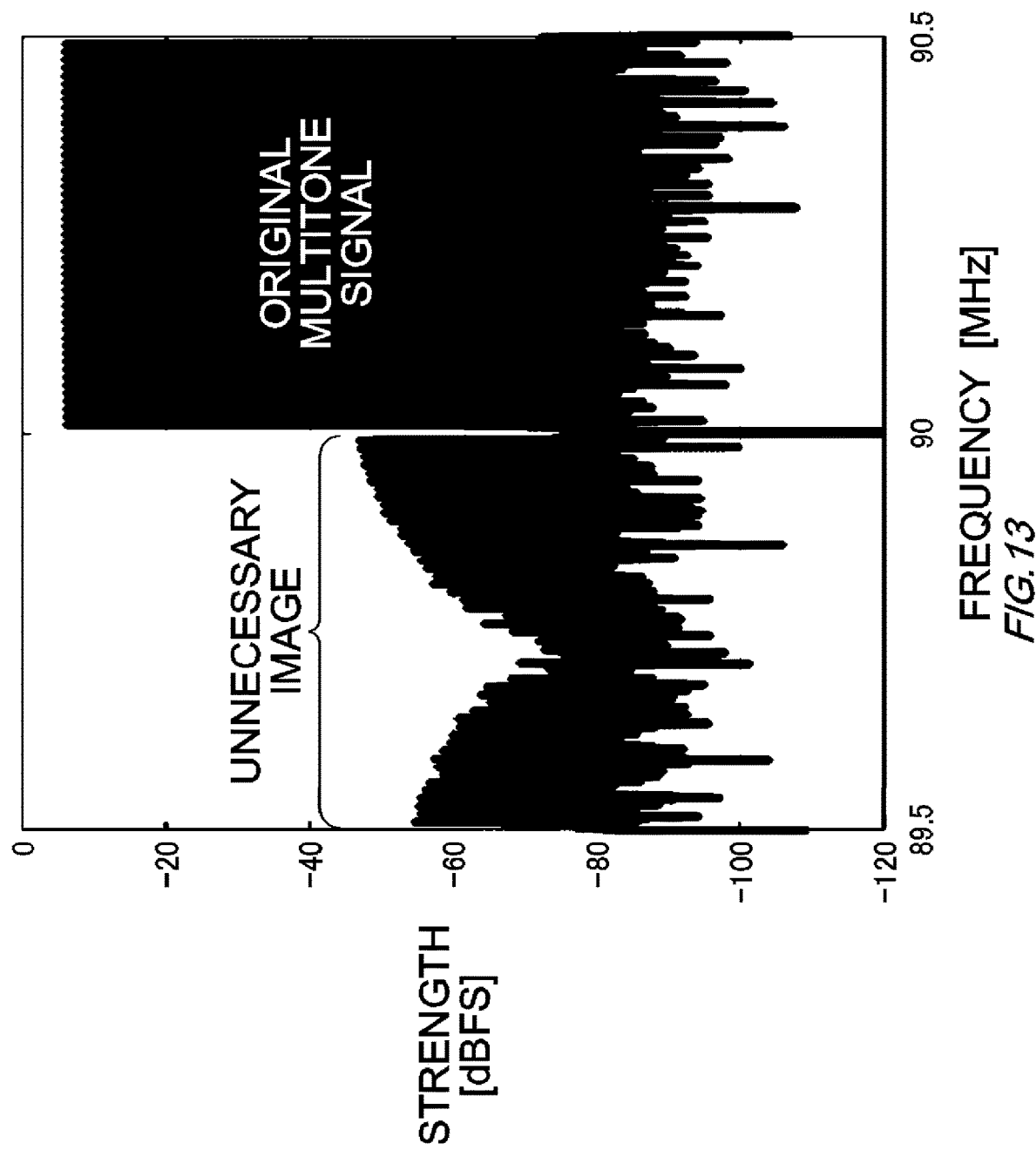
FIG. 13 shows an example of an unnecessary image generated in an output signal obtained by reconstructing a multitone signal.

FIG. 13 shows an example of an unnecessary image generated in an output signal obtained by reconstructing a multitone signal. In the present drawing, the horizontal axis represents the frequency and the vertical axis represents a signal strength (dBFS). The graph in the present drawing shows an output signal obtained by reconstructing, by a WMC, the multitone signal having the tones at regular frequency intervals in a frequency band of 90 MHz to 90.5 MHz which centers 90.25 MHz.

When the low-pass filter in reality is used, in the reconstructed output signal, spurious which is generated by the low-pass filter is, as an unnecessary image, superimposed on the signal corresponding to the original multitone signal. In the example of the present drawing, such an unnecessary image is remarkably seen in a frequency range of 89.5 MHz to 90 MHz.

Figure 14:
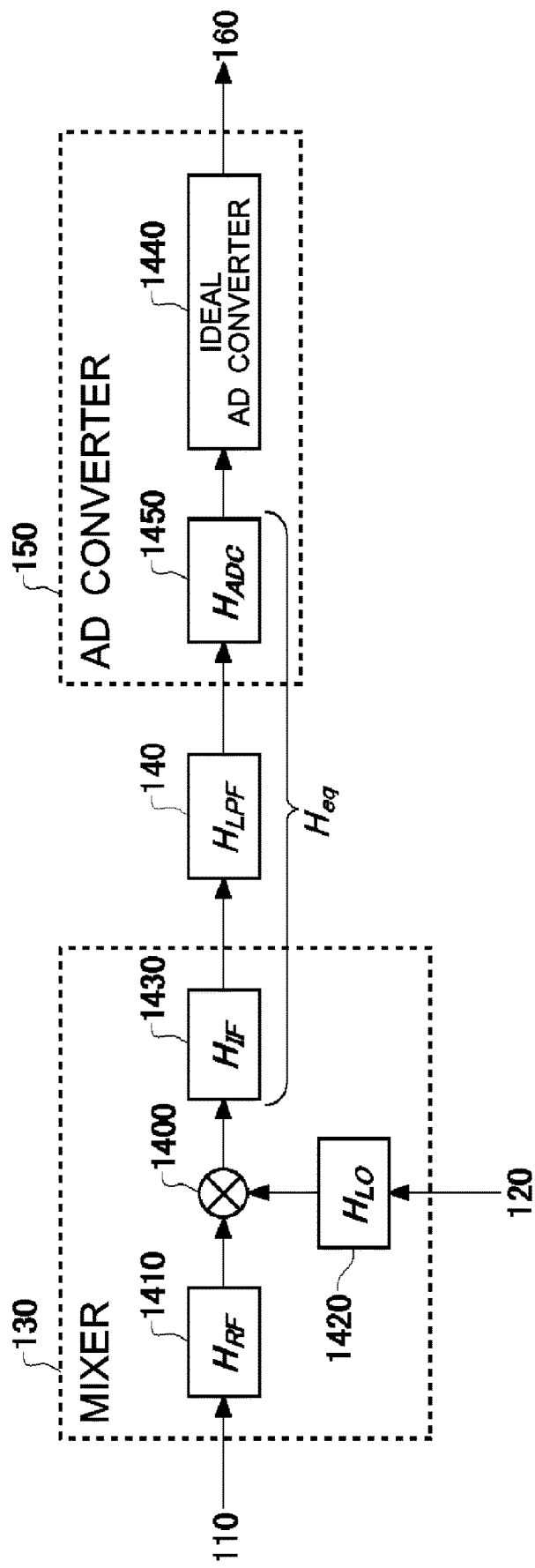
FIG. 14 shows a model of a front end portion of the conversion device.

FIG. 14 shows a model of a front end portion of the conversion device 100. The model in the present drawing schematically shows a set of the mixer 130, the bandpass filter 140, and the AD converter 150 in the conversion device 100.

The mixer 130 can be represented by a model in which frequency characteristics of a signal input characteristic 1410, a PSF input characteristic 1420, and a mixer output characteristic 1430 are respectively superimposed on an ideal mixer 1400. The ideal mixer 1400 is a mixer having the ideal frequency characteristic (a frequency response). In the mixer 130 in reality, the input signal x(t) is affected by the signal input characteristic 1410 unique to the mixer 130. This signal input characteristic 1410 is denoted as $H_{RF}$.

Further, in the mixer 130 in reality, the ideal signal pattern $p_i(t)$ to be generated by the periodic signal generator 120 is affected by the PSF input characteristic 1420 unique to the mixer 130. This PSF input characteristic 1420 is denoted as $H_{LO}$. Further, in the mixer 130 in reality, the signal that is output by the mixer 130 is affected by the mixer output characteristic 1430 unique to the mixer 130. This mixer output characteristic 1430 is denoted as $H_{IF}$.

The low-pass filter in reality, which is used as the bandpass filter 140, can be represented by a model having a frequency characteristic $H_{LPF}$ different from the ideal frequency characteristic. This frequency characteristic $H_{LPF}$ is, for example, the frequency characteristic shown by the solid line in FIG. 12.

The AD converter 150 can be represented by a model in which an influence of an AD conversion characteristic 1450 is superimposed on an ideal AD converter 1440 having the ideal frequency characteristic. This AD conversion characteristic 1450 is denoted as $H_{ADC}$.

In the above description, each actual frequency component $\tilde{c}_{i,l}$ of the signal pattern which is input to the ideal mixer 1400 is obtained by multiplying the ideal frequency component $c_{i,l}$ by the PSF input characteristic 1420 ($H_{LO}$), as shown in the following Expression 5.

[Expression 5]

$$\tilde{c}_{i,l} = c_{i,l} H_{LO}(lfp) \quad (5)$$

As shown in relation to FIG. 1 to FIG. 11, the calibration processing unit 190 and the calibration processing unit 1100 can calculate each actual frequency component $\tilde{c}_{j,l}$ to calibrate the reconstruction unit 160. Here, as shown in the following Expression 6, the equivalent frequency characteristic, in which the mixer output characteristic 1430 ($H_{IF}$), the frequency characteristic ($H_{LPF}$) of the bandpass filter 140, and the AD conversion characteristic 1450 ($H_{ADC}$) are combined, is set as $H_{eq}$.

[Expression 6]

$$H_{eq} = H_{IF} H_{LPF} H_{ADC} \quad (6)$$

When the sampling frequency fs of the AD converter 150 is equal to the frequency fp of the signal pattern (when fs=fp), an actual bandpass signal $\tilde{Y}_i(e^{j\omega T_s})$ which is output by the AD converter 150 of the i-th front end is represented by the following Expression 7.

[Expression 7]

$$\tilde{Y}_i(e^{j\omega T_s}) = \left( \sum_{l=-L_0}^{L_0} \tilde{c}_{i,-l} Z_l(f) R_l(f) \right) H_{eq}(f) \quad (7)$$

Here, $R_l(f)$ is a spectrum for one frequency slot (for the frequency band of the frequency width fp which centers on the frequency l·fp) of $H_{RF}(f)$, and $R_l(f) = H_{RF}(f - lf_p)$. Further, in the input signal $X(f)$, the spectrum of the signal in the frequency slot, in which a center frequency is lfp and the frequency width is fp, is denoted as $Z_l(f)$.

When the sampling frequency fs of the AD converter 150 is q times the frequency fp of the signal pattern (when fs=qfp, and q is a positive integer), an actual bandpass signal $\tilde{Y}'_i(e^{j\omega T_s})$ which is output by the AD converter 150 of the i-th front end is represented by the following Expression 8.

[Expression 8]

$$\tilde{Y}_i(e^{j\omega T_s}) = \left( \sum_{k=-q'}^{q'} \sum_{l=-L_0-k}^{L_0-k} \tilde{c}_{i,-(l+k)} \times Z_{l+k}(f - kf_p) R_{l+k}(f - kf_p) \right) H_{eq} \quad (8)$$

Note that the influence of the signal input characteristic 1410 is small, and thus can be ignored. Alternatively, the conversion device such as the conversion device 100 may correct, as an example, the equivalent frequency characteristic $H_{eq}$, calibrate the reconstruction unit 160 as shown in FIG. 1 to FIG. 11, and then further input an input signal that serves as a reference to calibrate the signal input characteristic 1410.

Figure 15:
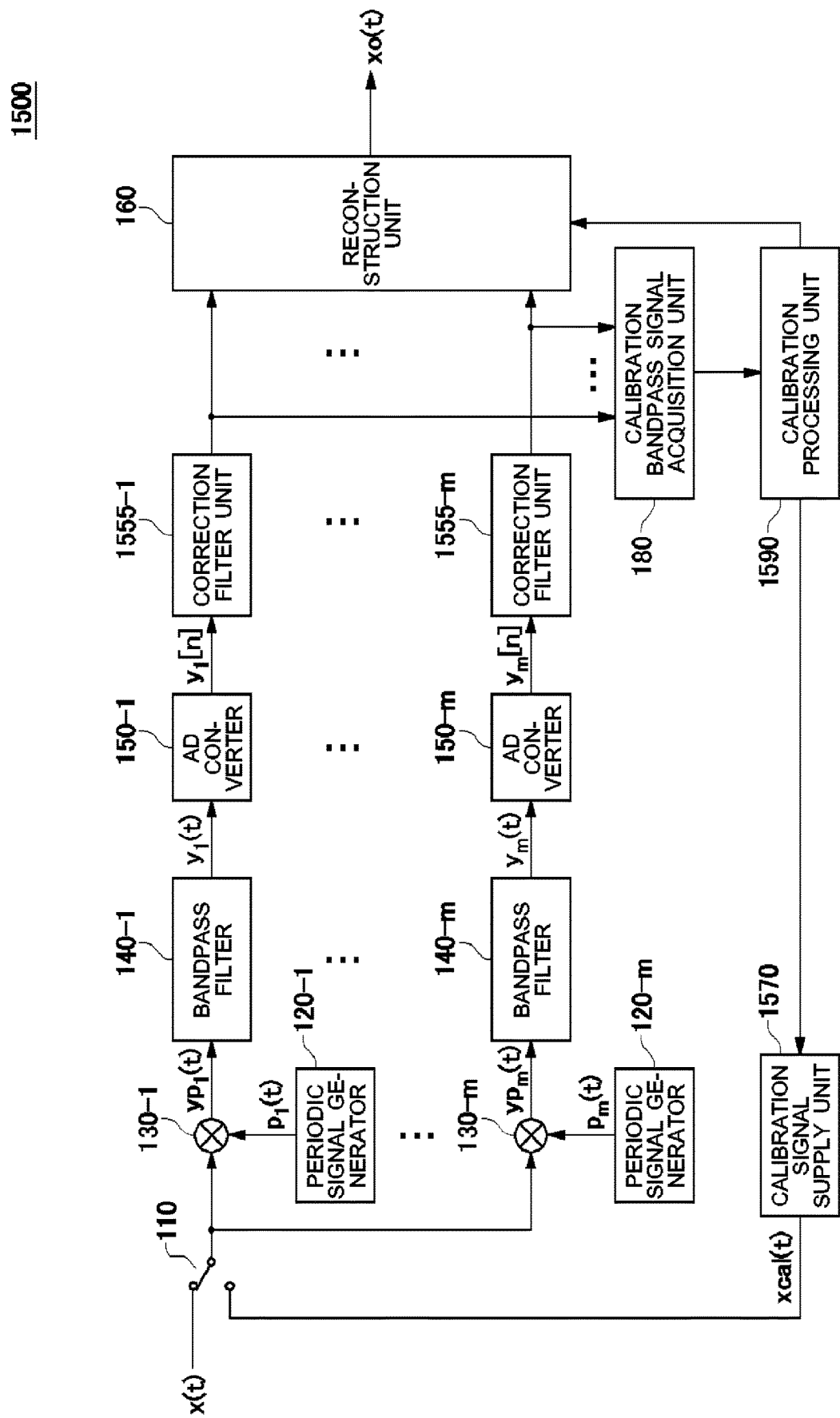
FIG. 15 shows a configuration of a conversion device according to a modification example of the present embodiment.

FIG. 15 shows a configuration of a conversion device 1500 according to a modification example of the present embodiment. The conversion device 1500 shown in the present drawing is a modification example of the conversion device 100 shown in FIG. 1. Among the respective components shown in the present drawing, the components having the same signs and numerals as those in FIG. 1 have the similar functions and configurations as the corresponding components in FIG. 1. Accordingly, the detailed description will be omitted except for the following differences.

The conversion device 1500 is set to have a configuration in which the conversion device 100 shown in FIG. 1 is changed to reduce or eliminate the influence of the actual equivalent frequency characteristic $H_{eq}$ of each front end. The conversion device 1500 is set to have a configuration in which a plurality of correction filter units 1555-1 to m (also referred to as a "correction filter unit 1555") are added to a back stage of the plurality of AD converters 150 to m in the conversion device 100. The plurality of correction filter units 1555 are configured to output a plurality of correction bandpass signals obtained by correcting a plurality of bandpass signals yl[n] to ym[n] from the plurality of AD converters 150. Thereby, each correction filter unit 1555 reduces or eliminates the influence of the equivalent frequency characteristic $H_{eq}$ superimposed on the bandpass signal $y_i[n]$. The reconstruction unit 160 reconstructs the output signal from the plurality of correction bandpass signals.

Along with this, the conversion device 1500 includes a calibration signal supply unit 1570 and a calibration processing unit 1590 instead of the calibration signal supply unit 170 and the calibration processing unit 190 in FIG. 1. The calibration signal supply unit 1570 is connected to the calibration processing unit 1590. The calibration signal supply unit 1570 generates the calibration input signal xcal(t) for calibrating each correction filter unit 1555 in response to an instruction from the calibration processing unit 1590, to supply the generated calibration input signal xcal(t), via the selector 110, to the converter that has the plurality of periodic signal generator 120, the plurality of mixers 130, the plurality of bandpass filters 140, the plurality of AD converters 150, the plurality of correction filter units 1555, and the reconstruction unit 160.

The calibration processing unit 1590 is connected to the calibration bandpass signal acquisition unit 180. The calibration processing unit 1590 receives, from the calibration bandpass signal acquisition unit 180, the plurality of the calibration bandpass signals $y_i[n]$ obtained by the converter in response to the calibration input signal xcal(t) generated by the calibration signal supply unit 1570. In the example of the present drawing, the calibration processing unit 1590 receives, from the calibration bandpass signal acquisition unit 180, the plurality of calibration bandpass signals corrected by the plurality of correction filter units 1555. The calibration processing unit 1590 is configured to calibrate, based on each of the plurality of calibration bandpass signals, a correction filter in the correction filter unit 1555 configured to correct each of the plurality of bandpass signals. Note that the calibration signal supply unit 1570 and the calibration processing unit 1590 may have the functions and the configurations of the calibration signal supply unit 170 and the calibration processing unit 190 for calibrating the parameter for the reconstruction which is used by the reconstruction unit 160 as shown in FIG. 1 to FIG. 11.

The calibration processing unit 1590 shown above receives, from the calibration bandpass signal acquisition unit 180, the plurality of calibration bandpass signals corrected by the plurality of correction filter units 1555. Therefore, the equivalent frequency characteristic $H_{eq}$ shown in FIG. 14 is a frequency characteristic in a part of a pass until the calibration bandpass signal is obtained from the calibration input signal. By calibrating the correction filter by using the plurality of calibration bandpass signals after the correction by the plurality of correction filter units 1555, the calibration processing unit 1590 can further repeat the calibration processing on the calibrated correction filter to be able to enhance the precision of the correction filter.

Alternatively, the calibration processing unit 1590 may receive, from the calibration bandpass signal acquisition unit 180, the plurality of calibration bandpass signals, which are output by the plurality of AD converters 150, before being corrected by the plurality of correction filter units 1555, and calibrate the plurality of the correction filters. In this case, the equivalent frequency characteristic $H_{eq}$ shown in FIG. 14 is the frequency characteristic of the entire pass until the calibration bandpass signal is obtained from the calibration input signal.

Figure 16:
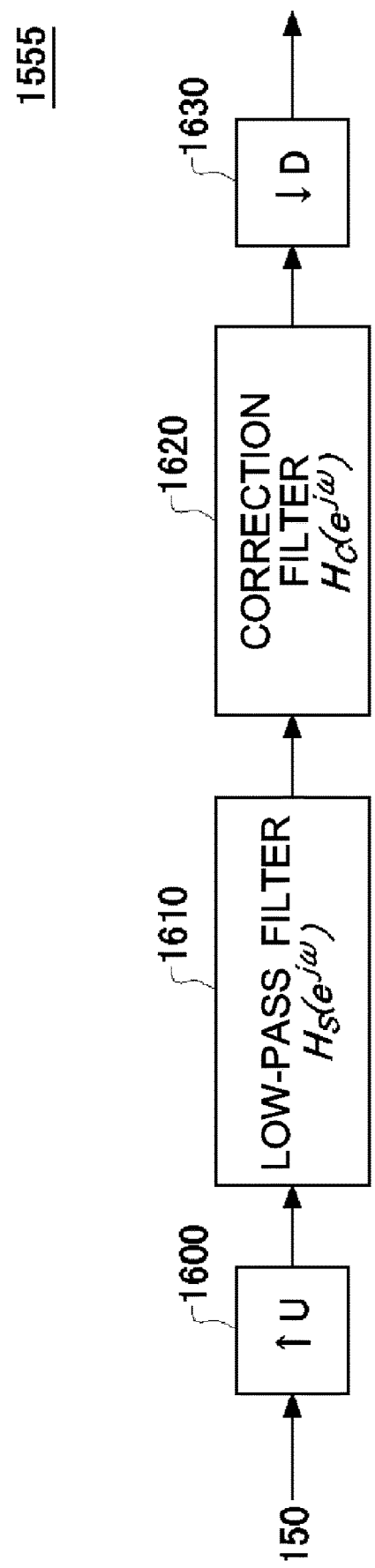
FIG. 16 shows a configuration of a correction filter unit according to the modification example of the present embodiment.

FIG. 16 shows a configuration of the correction filter unit 1555 according to the modification example of the present embodiment. The correction filter unit 1555 includes an upsampler 1600, a low-pass filter 1610, a correction filter 1620, and a downsampler 1630.

The upsampler 1600 upsamples the bandpass signal that is input to the correction filter unit 1555 among the plurality of bandpass signals from the plurality of AD converters 150. The low-pass filter 1610 is connected to the upsampler 1600. The low-pass filter 1610 performs the low-pass filtering of passing the bandpass signal upsampled by the upsampler 1600 and reduces or eliminates high frequency component at the cutoff frequency or higher. The cutoff frequency of the low-pass filter 1610 may be the same as the ideal cutoff frequency (the cutoff frequency shown in FIG. 12) for the bandpass filter 140 to have. Alternatively, the low-pass filter 1610 may have a cutoff frequency higher than the cutoff frequency of the bandpass filter 140. The frequency characteristic of the low-pass filter 1610 is denoted as $H_S(e^{j\omega})$.

The correction filter 1620 is connected to the low-pass filter 1610. The correction filter 1620 is configured to correct the bandpass signal that has passed through the low-pass filter 1610. The frequency characteristic of the correction filter 1620 is denoted as $H_C(e^{j\omega})$.

The downsampler 1630 downsamples the bandpass signal corrected by the downsampler 1630. The downsampler 1630 may be a decimation filter, or may be a thinning filter that thins out and outputs the bandpass signal.

The correction filter unit 1555 shown above can perform, by the digital low-pass filter 1610, the low-pass filtering of passing the frequency component (refer to FIG. 12) with the cutoff frequency ($f_{bpf}$) or higher in the digital bandpass signal AD-converted by the AD converter 150. As the low-pass filter 1610, for example, it is possible to use a digital filter in which the order of the digital filter or the like is adjusted in advance such that an error of the reconstructed output signal which is output by the reconstruction unit 160 according to the frequency component with the cutoff frequency or higher in the bandpass signal is within a tolerable range.

Further, the correction filter unit 1555 can correct, by the correction filter 1620, the frequency component below the cutoff frequency in the digital bandpass signal. As an example, the correction filter 1620 is adjusted to have an inverse characteristic of the equivalent frequency characteristic He below the cutoff frequency. Thereby, the correction filter 1620 can correct the bandpass signal such that the front end from the mixer 130 to the correction filter unit 1555 has a constant gain below the cutoff frequency. The correction filter 1620 may also correct the bandpass signal such that the front end has a constant phase delay below the cutoff frequency.

Note that in the present modification example, in the upsampler 1600 and the downsampler 1630, the frequency of the bandpass signal is once increased to enhance the precision of the low-pass filter processing by the low-pass filter 1610 and the correction processing by the correction filter 1620. Alternatively, the correction filter unit 1555 may have a configuration in which at least one of the upsampler 1600 or the downsampler 1630 is not included.

Figure 17:
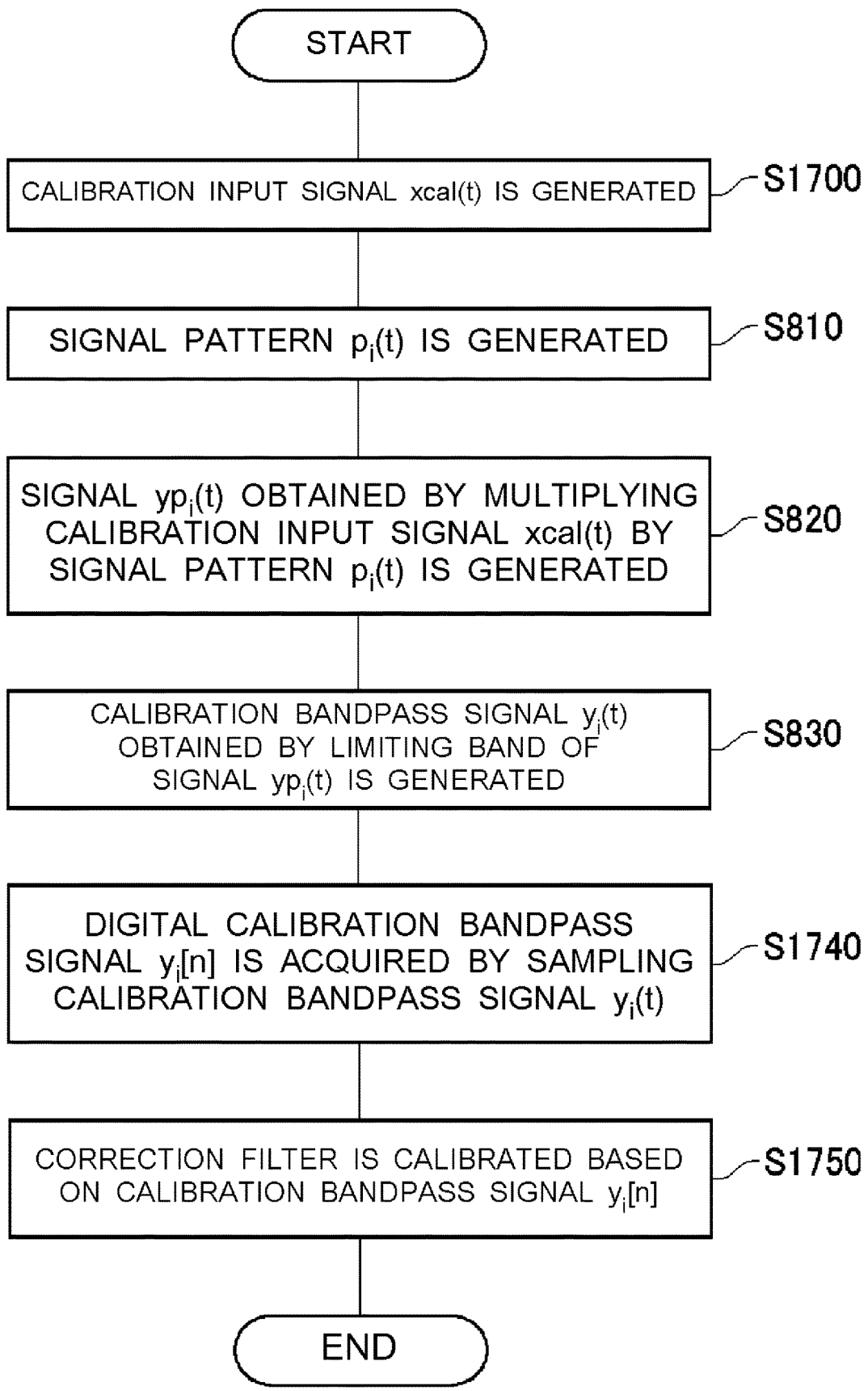
FIG. 17 shows an example of a calibration flow of a correction filter according to the modification example of the present embodiment.

FIG. 17 shows an example of a calibration flow of a correction filter according to the modification example of the present embodiment. Note that the calibration flow according to the modification example is a modification example of the configuration flow shown in FIG. 8, and thus hereinafter the description will be omitted except for the differences.

In S1700, the calibration signal supply unit 1570 generates the calibration input signal xcal(t) which is the multi-tone signal having the tones at the plurality of frequencies. Here, the calibration input signal xcal(t) used for calibrating the correction filter 1620 will be described later in relation to FIG. 20 and FIG. 21. In the calibration operation, the selector 110 supplies the calibration input signals xcal(t) to the plurality of mixers 130.

Step S810 to step S830 are similar to S810 to S830 in FIG. 8. In S1740, the plurality of AD converters 150 output the plurality of digital calibration bandpass signals $y_i[n]$ by sampling and AD-converting the plurality of calibration bandpass signals $y_i(t)$. In the present modification example, the plurality of correction filter units 1555 output, as the plurality of digital calibration bandpass signals $y_i[n]$, the signals obtained by correcting the plurality of digital calibration bandpass signals $y_i[n]$ which are output by the plurality of AD converters 150. The calibration bandpass signal acquisition unit 180 acquires the plurality of the calibration bandpass signals $y_i[n]$ which are output by the plurality of correction filter units 1555. Since S1740 is similar to S840 in other points, the description thereof will be omitted except for the following differences.

In S1750, the calibration processing unit 190 calibrates the correction filter 1620 of each of the plurality of correction filter units 1555 based on the plurality of calibration bandpass signals $y_i[n]$. Note that based on the result of supplying the calibration input signals xcal(t) to a plurality of front ends at the same time (S1700 to S1740), the conversion device 1500 may calibrate the correction filter 1620 of each of the plurality of front ends. Alternatively, the conversion device 1500 may individually perform the processing of FIG. 17 on each of the plurality of front ends. Hereinafter, by using FIG. 18 to FIG. 26, the configuration of the calibration processing unit 1590 and the calibration operation of the correction filter 1620 by the conversion device 1500 will be described more specifically.

Figure 18:
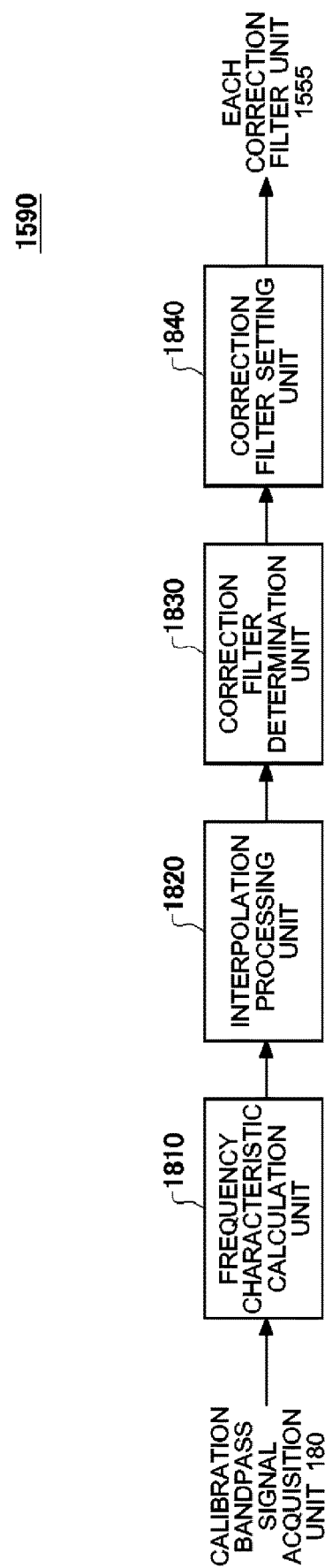
FIG. 18 shows a configuration of a calibration processing unit according to the modification example of the present embodiment.

FIG. 18 shows a configuration of the calibration processing unit 1590 according to the modification example of the present embodiment. The calibration processing unit 1590 has a frequency characteristic calculation unit 1810, an interpolation processing unit 1820, a correction filter determination unit 1830, and a correction filter setting unit 1840.

The frequency characteristic calculation unit 1810 receives the plurality of calibration bandpass signals $y_i[n]$ after the correction that are output by each AD converter 150 in response to the calibration input signal xcal(t), which is the multitone signal for calibrating the correction filter 1620, being input to the converter. Here, the plurality of calibration bandpass signals $y_i[n]$ received by the frequency characteristic calculation unit 1810 are obtained by correcting the bandpass signals $Y'_i(e^{j\omega Ts})$ of the Expression 8 by the correction filter unit 1555, and thus has a large number of tones in which each tone of the calibration input signal xcal(t) is frequency-converted for each frequency slot by each frequency component $c_{i,l}$ of the signal pattern $P_i(f)$. Then, the tone of each frequency included in each calibration bandpass signal $y_i[n]$ is affected, in the equivalent frequency characteristic $H_{eq}$, by the characteristic of the frequency thereof.

The frequency characteristic calculation unit 1810 calculates the equivalent frequency characteristic $H^\wedge_{eq}$ at the frequency of each tone based on each tone included in the calibration bandpass signal $y_i[n]$ for each front end i. The equivalent frequency characteristic $H^\wedge_{eq}$ which is calculated by the frequency characteristic calculation unit 1810 is a discrete equivalent frequency characteristic having a characteristic corresponding only to a frequency position of each tone.

The interpolation processing unit 1820 is connected to the frequency characteristic calculation unit 1810. The interpolation processing unit 1820 estimates a continuous equivalent frequency characteristic $H_{eq}$ by interpolating the discrete equivalent frequency characteristic $H^\wedge_{eq}$ for each front end i.

The correction filter determination unit 1830 is connected to the interpolation processing unit 1820. The correction filter determination unit 1830 determines the frequency characteristic of the correction filter 1620 based on the estimated equivalent frequency characteristic $H_{eq}$ for each front end i. Here, the correction filter determination unit 1830 determines the frequency characteristic of the correction filter 1620 to cancel the estimated equivalent frequency characteristic $H_{eq}$ or reduce the influence of the equivalent frequency characteristic $H_{eq}$.

The correction filter setting unit 1840 is connected to the correction filter determination unit 1830. The correction filter setting unit 1840 calculates the parameter of the correction filter 1620 to have the determined frequency characteristics. The correction filter setting unit 1840 sets the calculated parameter to the correction filter 1620.

Figure 19:
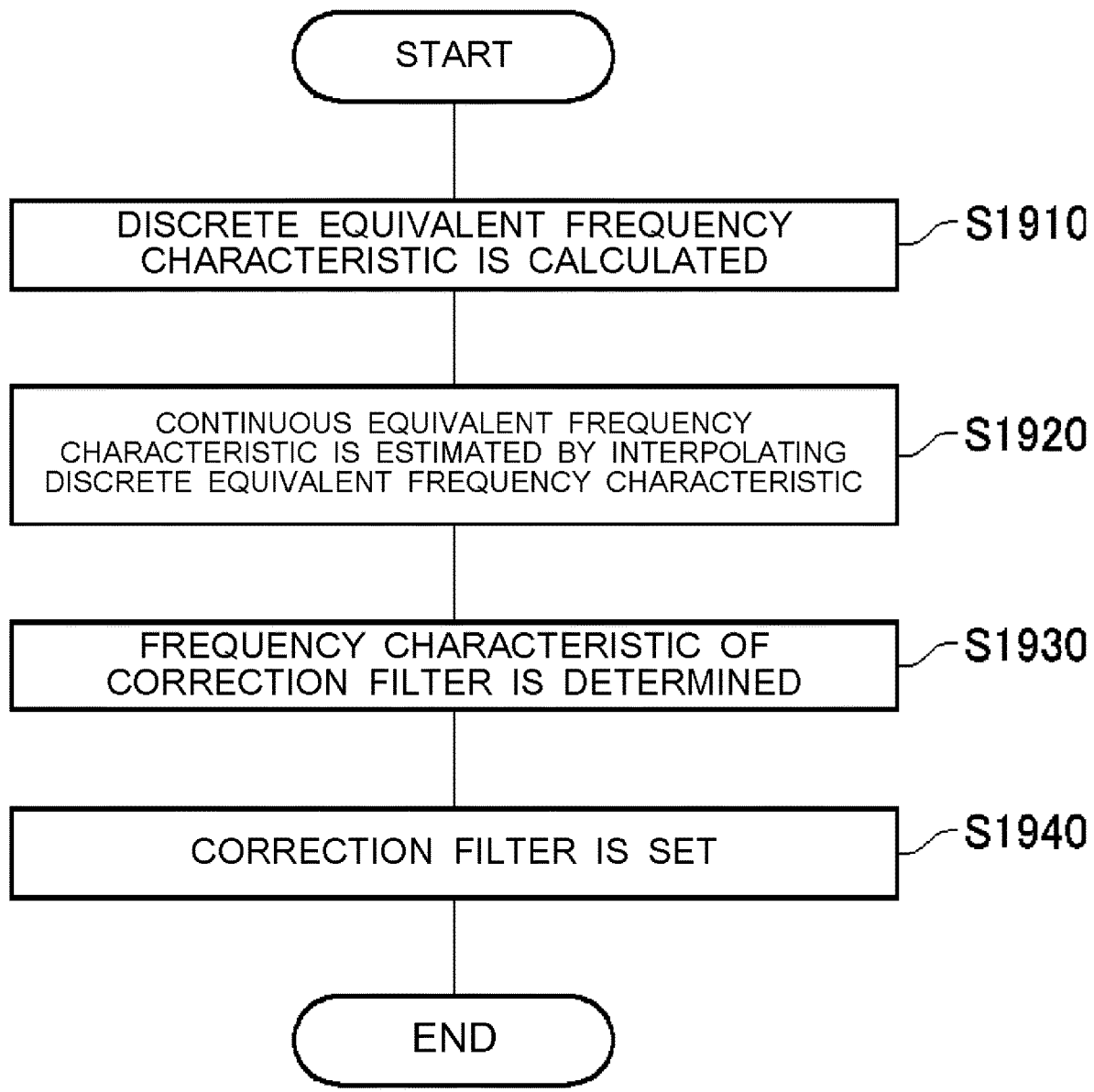
FIG. 19 shows an example of an operation flow of the calibration processing unit according to the modification example of the present embodiment.

FIG. 19 shows an example of an operation flow of the calibration processing unit 1590 according to the modification example of the present embodiment. The calibration processing unit 1590 performs the processing shown in S1750 of FIG. 17 in the present drawing.

In S1910, the frequency characteristic calculation unit 1810 calculates the discrete equivalent frequency characteristic $H^\wedge_{eq}$ at the frequency of each tone based on each tone included in the calibration bandpass signal $y_i[n]$ for each front end i. In S1920, the interpolation processing unit 1820 estimates the continuous equivalent frequency characteristic $H_{eq}$ by interpolating the discrete equivalent frequency characteristic $H^\wedge_{eq}$ for each front end i.

In S1930, the correction filter determination unit 1830 determines the frequency characteristic of the correction filter 1620 based on the estimated equivalent frequency characteristic $H_{eq}$ for each front end i. In S1940, the correction filter setting unit 1840 calculates the parameter of the correction filter 1620 to have the determined frequency characteristics. The correction filter setting unit 1840 sets the calculated parameter to the correction filter 1620.

Figure 20:
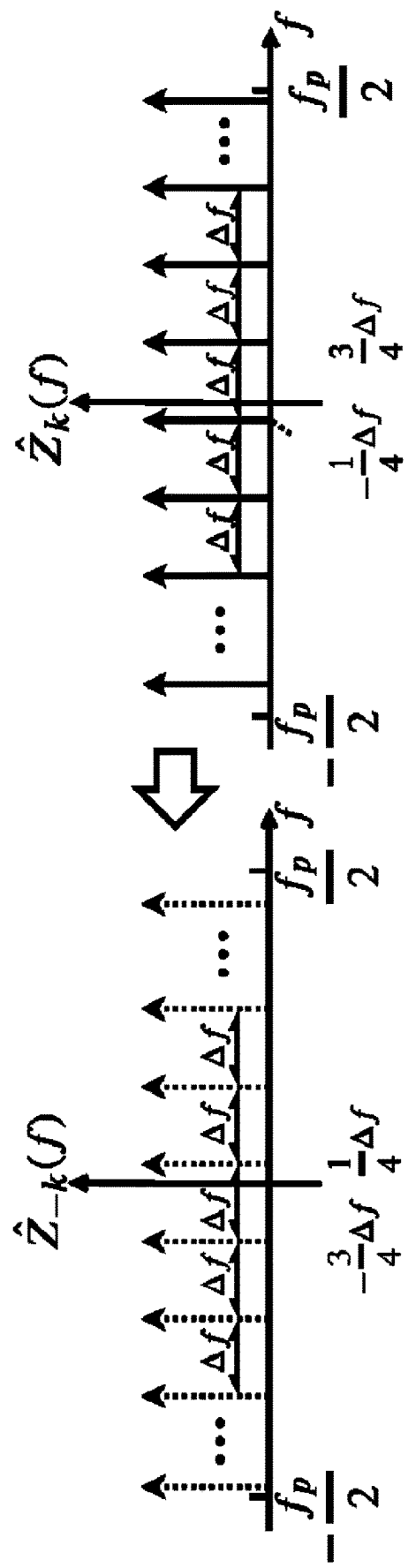
FIG. 20 shows an example of a baseband spectrum of a calibration input signal Z^k(f) according to the modification example of the present embodiment.

FIG. 20 shows an example of a baseband spectrum of a calibration input signal $Z^\wedge_k(f)$ according to the modification example of the present embodiment. In the present modification example, as shown on the right side of the present drawing, in a frequency slot which has frequency 0 as the center frequency, and which has the width fp of the repetition frequency, the calibration input signal $Z^\wedge_k(f)$ of the baseband has a tone at each of the plurality of frequencies arranged asymmetrically with respect to the center frequency.

At least one tone of the calibration input signal $Z^\wedge_k(f)$ has a frequency in which no other tone of the calibration input signal $Z^\wedge_k(f)$ exists at a frequency which is symmetric with respect to a frequency of the tone with the center frequency as a center. For example, in relation to the tone having a frequency $3/4\Delta f$ in the present drawing, the calibration input signal $Z^\wedge_k(f)$ has no other tone at a frequency $-3/4\Delta f$ which is symmetric with respect to the frequency of this tone with the center frequency 0 as the center. In the present modification example, all tones of the calibration input signal $Z^\wedge_k(f)$ are determined to have frequencies in which no other tone of the calibration input signal $Z^\wedge_k(f)$ exists at the frequency which is symmetric with respect to the frequency of the tone with the center frequency as the center.

Each tone of the calibration input signal $Z^\wedge_k(f)$ may be arranged in the frequency slot at a predetermined frequency interval. In the present modification example, each tone of the calibration input signal $Z^\wedge_k(f)$ is arranged in the frequency slot having the frequency width fp at a frequency interval of $\Delta f$, and one tone thereof is may be arranged at a position of $-1/4\Delta f$ from the center frequency.

The left side of the present drawing shows a conjugate image $Z^\wedge_{-k}(f)$ of the baseband which is generated along with the calibration input signal $Z^\wedge_k(f)$ of the baseband and in which the positive and the negative frequencies of each tone of $Z^\wedge_k(f)$ are inverted with the frequency axis as the center. By each tone of the calibration input signal $Z^\wedge k(f)$ being arranged asymmetrically with respect to the center frequency, each tone of the conjugate image $Z^\wedge_{-k}(f)$ is positioned at a different frequency from that of each tone of the calibration input signal $Z^\wedge k(f)$.

Figure 21:
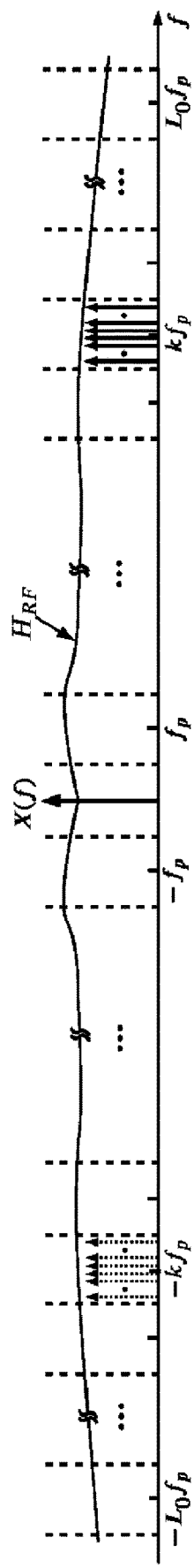
FIG. 21 shows an example of a spectrum of a calibration input signal X(f) according to the modification example of the present embodiment.

FIG. 21 shows an example of a spectrum of a calibration input signal X(f) according to the modification example of the present embodiment. In S1700 of FIG. 17, by generating the calibration input signal $Z^\wedge_k(f)$ of the baseband shown in FIG. 20 in the frequency slot having, as the center frequency, a frequency of an integer multiple (k times in the drawing) of the repetition frequency fp of the signal pattern, the calibration signal supply unit 1570 generates the calibration input signal X(f). Here, k may be an integer of one or more, or may be two or more.

The calibration input signal $Z^\wedge_k(f)$ of the baseband shown on the right side of FIG. 20 is frequency-shifted and arranged in a k-th frequency slot (a frequency slot of a center frequency kfp) in the calibration input signal X(f). In the present modification example, the calibration input signal X(f) may be represented by the following Expression 9 in the time domain.

[Expression 9]

$$x_{LPF}(t) = \sum_{\xi=0}^{G} \cos\left(2\pi\left(\xi\Delta f + \frac{\Delta f}{4} - \frac{f_p}{2} + f_c\right)t + \phi\xi\right) \qquad (9)$$

Here, $\varphi_\xi$ is the initial phase of the calibration input signal $x_{LPF}(t)$, and G is the number of tones in the frequency slot. As an example, G is an odd number. The sign fc is the center frequency of the frequency slot that generates the calibration input signal $Z^\wedge_k(f)$ of the baseband, and fc=kfp may be established. The sign $\Delta f$ is the frequency interval between the tones, and $\Delta f$=fp/G may be established.

Each tone of the calibration input signal $x_{LPF}(t)$ shown in the Expression 9 has the same signal strength. Alternatively, at least one tone of the calibration input signal may have a signal strength different from those of other tones.

The calibration signal supply unit 1570 may adjust the initial phase $\varphi_\xi$ of each tone such that the amplitude of the calibration input signal $x_{LPF}(t)$ is minimized, as described in relation to the phase amplitude setting unit 1050 of FIG. 10. For example, as shown in the following Expression 10, the calibration signal supply unit 1570 may keep the maximum amplitude of the calibration input signal $x_{LPF}(t)$ within the rated range of the converter by setting the initial phase $\varphi_\xi$ of each tone to the Neuman phase described in Non-Patent Document 9.

[Expression 10]

$$\phi_\xi = \frac{\pi(\xi-1)^2}{G} \quad (10)$$

When the calibration input signal $Z^\wedge_k(f)$ of the baseband is frequency-shifted and arranged in the k-th frequency slot in the calibration input signal X(f), as shown in the present drawing, the conjugate image $Z^\wedge_{-k}(f)$ of $Z^\wedge_k(f)$ as shown on the right side of FIG. 20 is superimposed on a −k-th frequency slot (a frequency slot of the center frequency −kfp) in the calibration input signal X(f). The calibration input signal X(f) may not have the tone in the frequency slot other than the k-th slot and the −k-th frequency slot. Note that the calibration input signal X(f) which is actually input to the mixer 130 is affected by the signal input characteristic 1410 ($H_{RF}$) as shown in the drawing, for example.

Figure 22:
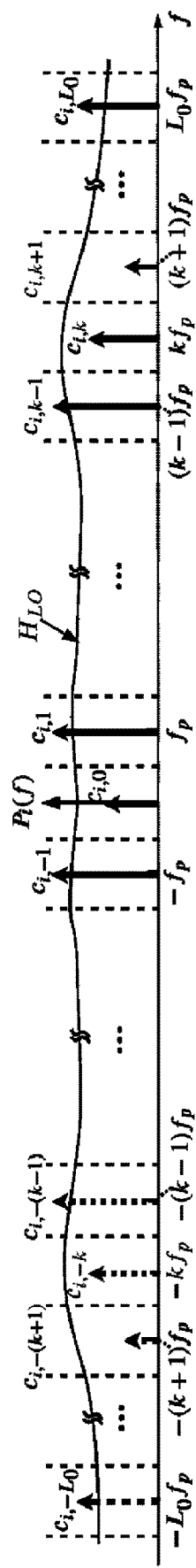
FIG. 22 shows an example of a spectrum of the signal pattern Pi(f) according to the modification example of the present embodiment.

FIG. 22 shows an example of a spectrum of the signal pattern $P_i(f)$ according to the modification example of the present embodiment. In S810 of FIG. 17, the periodic signal generator 120 generates the signal pattern $p_i(f)$ shown in the present drawing.

As shown in relation to FIG. 4, the signal pattern $P_i(f)$ includes the frequency component $c_{i,l}$ of the frequency l·fp in the range of l=−$L_0$ to $L_0$. Note that the negative frequency component $c_{i,-l1}$ (l1>0) in the signal pattern $P_i(f)$ is the conjugate image of the positive frequency component $c_{i,l1}$ which is symmetric with respect to the frequency axis (a vertical axis positioned at the frequency 0), and has the same magnitude as the positive frequency component $c_{i,l1}$. Note that the signal pattern $P_i(f)$ which is actually input to the mixer 130 is affected by the PSF input characteristic 1420 ($H_{LO}$) as shown in the drawing, for example.

Figure 23:
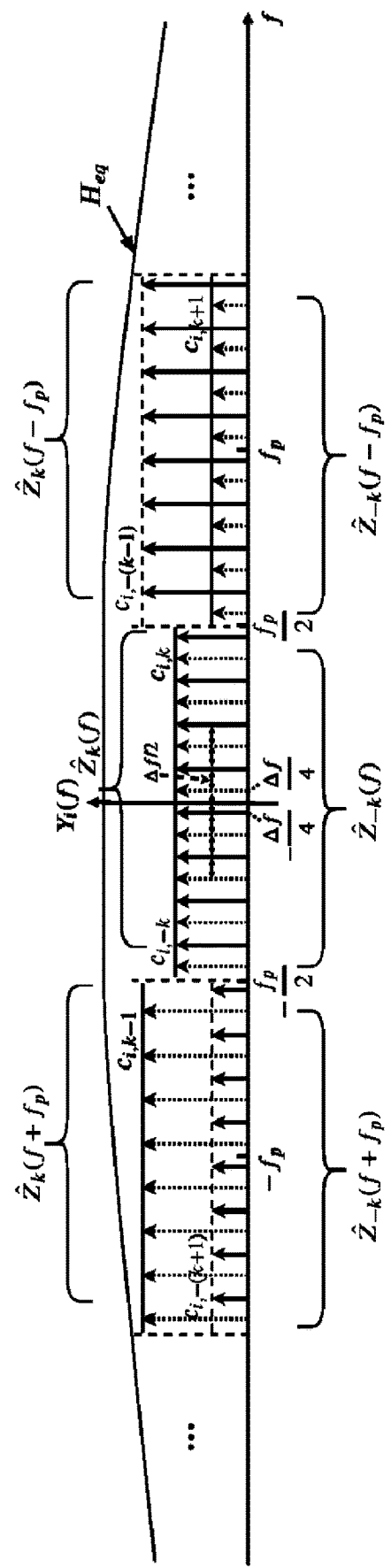
FIG. 23 shows an example of a spectrum of a signal that is input to an AD converter according to the modification example of the present embodiment.

FIG. 23 shows an example of a spectrum of a signal that is output by the AD converter 150 according to the modification example of the present embodiment. In S820 of FIG. 17, the mixer 130 multiplies the signal pattern $P_i(f)$ shown in FIG. 21 by the calibration input signal X(f) shown in FIG. 22. Thereby, $Z^\wedge_k(f-kfp)$ which is in the frequency slot having, as the center frequency, kfp in the calibration input signal X(f) is multiplied by each frequency component $c_{i,l}$ included in $P_i(f)$, is frequency-converted into each frequency slot in which the center frequency is (k+l)fp, and becomes the signal $c_{i,l}·Z^\wedge_k(f-(k+l)fp)$ obtained by multiplying $c_{i,l}$.

As shown in the present drawing, the calibration input signal $Z^\wedge_k(f-kfp)$ which is in the frequency slot having kfp as the center frequency is multiplied by the frequency component $c_{i,-(k+l)}$, is frequency-converted into the frequency slot in which the center frequency is −fp, and becomes the signal $c_{i,-(k+l)}·Z^\wedge_k(f+fp)$. The calibration input signal $Z^\wedge_k(f-kfp)$ is multiplied by the frequency component $c_{i,-k}$, is frequency-converted into the frequency slot in which the center frequency is 0, and becomes the signal $c_{i,-k}·Z^\wedge_k(f)$. Further, the calibration input signal $Z^\wedge_k(f-kfp)$ is multiplied by the frequency component $c_{i,-(k-l)}$, is frequency-converted into the frequency slot in which the center frequency is fp, and becomes the signal $c_{i,-(k-l)}·Z^\wedge_k(f-fp)$.

Similarly, the calibration input signal $Z^\wedge_{-k}(f+kfp)$ which is in the frequency slot having −kfp as the center frequency is multiplied by the frequency component $c_{i,k-l}$, is frequency-converted into the frequency slot in which the center frequency is −fp, and becomes the signal $c_{i,k-l}·Z^\wedge_{-k}(f+fp)$. The calibration input signal $Z^\wedge_{-k}(f+kfp)$ is multiplied by the frequency component $c_{i,k}$, is frequency-converted into the frequency slot in which the center frequency is 0, and becomes the signal $c_{i,k}·Z^\wedge_{-k}(f)$. Further, the calibration input signal $Z^\wedge_k(f-kfp)$ is multiplied by the frequency component $c_{i,k+l}$, is frequency-converted into the frequency slot in which the center frequency is fp, and becomes the signal $c_{i,k+l}·Z^\wedge_{-k}(f-fp)$.

Note that the present drawing shows, for convenience of description, only the frequency slots in which the center frequencies are 0 and +1 fp. Actually, the calibration input signal X(f) is multiplied by each of the frequency components $c_{i,-L0}$ to $c_{i,L0}$ of the signal pattern $P_i(f)$, and is frequency-converted into each of the frequency slots in which the center frequencies are −(L0+k)·fp to (L0+k)·fp.

As described above, the signal obtained by multiplying the calibration input signal X(f) and the signal pattern $P_i(f)$ has both of the plurality of tones obtained by frequency-converting the calibration input signals $Z^\wedge_k(f)$ of the baseband into each angular frequency slot, and the plurality of tones obtained by frequency-converting the conjugate image $Z^\wedge_{-k}(f)$ obtained by inverting $Z^\wedge_k(f)$ with the center frequency as the center. Here, the calibration input signal $Z^\wedge_k(f)$ of the baseband has the plurality of tones arranged asymmetrically with respect to the conjugate image inverted with the center frequency as the center, and thus each tone from the calibration input signal $Z^\wedge_k(f)$ in each frequency slot has the frequency different from that of each tone from the conjugate image $Z^\wedge_{-k}(f)$.

For example, in the frequency slot in which the center frequency is 0 in the present drawing, each tone of the calibration input signal $Z^\wedge_k(f)$ is arranged at the frequencies of . . . , −$\Delta f/4$, 3$\Delta f/4$, . . . . In contrast to this, each tone of the conjugate image $ZM_{-k}(f)$ is arranged at frequencies of . . . , −$\Delta 3f/4$, $\Delta f/4$, . . . . Therefore, there is a frequency difference of $\Delta f/2$ between each tone from the calibration input signal $Z^\wedge_k(f)$, and the adjacent tone from the conjugate image $Z^\wedge_{-k}(f)$.

In S830 of FIG. 17, the bandpass filter 140 limits the band of such a signal $yp_i(t)$ output by the mixer 130. In the present modification example, the bandpass filter 140 is the low-pass filter as an example, and performs Low-pass filtering of passing the signal that is output by the mixer 130. In S1740 of FIG. 17, the AD converter 150 samples the calibration bandpass signal $y_i(t)$, of which the band is limited by the bandpass filter 140, to acquire the digital calibration bandpass signal $y_i[n]$. The calibration bandpass signal $Y_i(f)$ in the frequency domain corresponding to the digital calibration bandpass signal $y_i[n]$ is affected by the equivalent frequency characteristic $H_{eq}$. The actual calibration bandpass signal $Y_i(f)$ is represented by $Y\tilde{}_i(f)$ shown by the following Expression 11.

[Expression 11]

$$\tilde{Y}_i(e^{j\omega T_s}) = \sum_{l=0}^{\infty}(\tilde{c}_{i,-(k-l)}Z_k(f-lf_p)R_k(f)+\tilde{c}_{i,(k+l)}Z_{-k}(f-lf_p)R_k(-f))H_{eq}(f) \quad (11)$$

In S1740 of FIG. 17, the correction filter unit 1555 corrects and outputs the digital calibration bandpass signal $y_i[n]$. Here, for convenience of description, it is assumed that the low-pass filter 1610 in the correction filter unit 1555 is an ideal low-pass filter. Further, it is assumed that the correction filter 1620 has a gain of 1 and a phase delay of 0 regardless of the frequency, and is initialized to output the signal, which is input, as is. In this case, the calibration processing unit 1900 receives, via the calibration bandpass signal acquisition unit 180, and as shown in the present drawing, the calibration bandpass signal $Y\tilde{}_i(f)$ which Includes the signal $c_{i,l}·Z\hat{}_k(f-(k+l)f_p)$ and the signal $c_{i,l}·Z\hat{}_{-k}(f-(-k+l)f_p)$ and is affected by the equivalent frequency characteristic $H_{eq}$. Note that the low-pass filtering of passing the calibration bandpass signal $Y\tilde{}_i(f)$ is performed by the low-pass filter 1610.

In S1750 of FIG. 17, the calibration processing unit 1590 calibrates the correction filter 1620 by using the calibration bandpass signal $Y\tilde{}_i(f)$. First, In S1910 of FIG. 19, the frequency characteristic calculation unit 1810 in the calibration processing unit 1590 calculates the discrete equivalent frequency characteristic $H\hat{}_{eq}[f\hat{}]$ at the frequency $f\hat{}$ of each tone based on each tone included in the calibration bandpass signal $y_i[n]$.

(1) When the Influence of the PSF Input Characteristic 1420 is not Taken into Consideration When the influence of the PSF input characteristic 1420 is small and may be ignored, the following Expression 12 can be obtained by substituting the actual frequency component $c\tilde{}_{i,l}$ of the signal pattern $P_i(f)$=the ideal frequency component $c_{i,l}$ in the Expression 11. Note that in the transformation from the Expression 11 to the Expression 12, the influence of the signal input characteristic 1410 is also ignored.

[Expression 12]

$$\hat{H}_{eq}[\hat{f}] = \frac{\tilde{Y}_i(e^{j2\pi \hat{f} T_s})}{\sum_{l=0}^{\infty}(c_{i,-(k-l)}Z_k(\hat{f}-lf_p)+c_{i,(k+l)}Z_{-k}(\hat{f}-lf_p))} \quad (12)$$

The sign $f\hat{}$ is a frequency in which the tone exists in the calibration bandpass signal $Y\tilde{}_i(f)$, and $f\hat{}=-\Delta f/4+n·\Delta f/2$ (note that n is an integer within a range in which the tone exists in $Y\tilde{}i(f)$) in FIG. 23. Here, the ideal frequency component $c_{i,l}$ of the signal pattern $P_i(f)$ can be calculated from the signal pattern $P_i(f)$. The ideal calibration input signal $Z_k(f)$ is also known. Accordingly, the frequency characteristic calculation unit 1810 can calculate the discrete equivalent frequency characteristic $H_{eq}[f\hat{}]$ of $H_{eq}(f)$ at each frequency $f\hat{}$ in which each tone of the calibration bandpass signal $Y\tilde{}_i(f)$ exists.

Note that as shown in FIG. 23, in each frequency slot of the calibration bandpass signal $Y\tilde{}_i(f)$, each tone corresponding to the calibration input signal $Z\hat{}_k(f)$ of the baseband, and each tone corresponding to the conjugate image $Z\hat{}_{-k}(f)$ has the frequency different from each other. Accordingly, the frequency characteristic calculation unit 1810 can distinguish, in the calibration bandpass signal $Y\tilde{}_i(f)$, between each tone corresponding to the calibration input signal $Z\hat{}_k(f)$ of the baseband, and each tone corresponding to the conjugate image $Z\hat{}_{-k}(f)$.

For example, when $f\hat{}=3·\Delta f/4$ is substituted into the Expression 12, as shown in FIG. 20, the conjugate image $Z_{-k}(f\hat{}-lp)$ of the calibration input signal $Z_k(f\hat{}-lp)$ (here, l=0) has no tone at this frequency $f\hat{}$ in the frequency slot, and thus the result is 0. Accordingly, when $f\hat{}=3·\Delta f/4$, the Expression 12 is $H_{eq}[3·\Delta f/4]=Y\tilde{}_i(3·\Delta f/4)/\{c_{i,-k}Z_k(3·\Delta f/4)\}$. Further, when $f\hat{}$ corresponds to the tone of $Z_k(f)$ included in the frequency slot of the center frequency $lf_p$, $H_{eq}[f\hat{}]=Y\tilde{}_i(f\hat{})/\{c_{i,-(k-l)}Z_k(f\hat{}-lf_p)\}$.

Accordingly, the frequency characteristic calculation unit 1810 can calculate the gain of the equivalent frequency characteristic $H_{eq}[f\hat{}]$ by dividing a signal strength of a certain tone To in the calibration bandpass signal $Y\tilde{}_i(f\hat{})$, by a signal strength of an original tone Ti frequency-converted into the tone To in the calibration input signal X(f), and a signal strength of a frequency component $c_{i,\alpha}$ obtained by frequency-converting the tone Ti to the tone To in the signal pattern $P_i(f)$. Further, the frequency characteristic calculation unit 1810 can calculate the phase of the equivalent frequency characteristic $H_{eq}[f\hat{}]$ by subtracting, from a phase of a certain tone To in the calibration bandpass signal $Y\tilde{}_i(f\hat{})$, a phase of an original tone Ti frequency-converted into the tone To in the calibration input signal X(f), and a phase of a frequency component $c_{i,\alpha}$ obtained by frequency-converting the tone Ti to the tone To in the signal pattern $P_i(f)$. In this way, the frequency characteristic calculation unit 1810 can calculate the gain and the phase of the discrete equivalent frequency characteristic $H_{eq}[f\hat{}]$ according to the signal strength and the phase between the plurality of tones included in the calibration bandpass signal $Y\tilde{}_i(f)$.

(2) When the Influence of PSF Input Characteristic 1420 is Taken into Consideration.

When the influence of the PSF input characteristic 1420 is taken into consideration, the actual frequency component $c\tilde{}_{i,l}$ of the signal pattern $P_i(f)$ in the Expression 11 is unclear. Then, the $c_{i,-(k-l)}$ and $c_{i,-(k+l)}$ in Expression 12 remain the actual frequency component $c\tilde{}_{i,-(k-l)}$ and $c\tilde{}_{i,-(k-l)}$, and thus it is not possible to directly calculate the equivalent frequency characteristic $H_{eq}[f\hat{}]$.

However, in this case as well, as shown in FIG. 23, in the same frequency slot, the frequency components $c\tilde{}_{i,-(k-l)}$ multiplied by the respective tones of a positive spectrum $Z_k(f)$ in the calibration input signal X(f) are the same, and the frequency components $c\tilde{}_{i,k-l}$ which are multiplied by the respective tones of a negative spectrum $Z_{-k}(f)$ in the calibration input signal X(f) are also the same.

Therefore, the frequency characteristic calculation unit 1810 calculates relative changes of the gain and the phase of the discrete equivalent frequency characteristic $H_{eq}[f\hat{}]$ in each frequency slot according to the changes of the signal strength and the phase between the plurality of tones included in each frequency slot in the calibration bandpass signal $Y\tilde{}_i(f)$. For example, in FIG. 23, it is assumed that the gain of $H\hat{}_{eq}[3·\Delta f/4]=Y\tilde{}_i(3·\Delta f/4)/\{c_{i,-k}Z_k(3·\Delta f/4)\}$ is 1.0, and the gain of $H\hat{}_{eq}[7·\Delta f/4]=Y\tilde{}_i(7·\Delta f/4)/\{c_{i,-k}Z_k(7·\Delta f/4)\}$ is 0.9. Here, when it is assumed that the signal strength of each tone of $Z_k(f)$ is constant regardless of the frequency, the frequency characteristic calculation unit 1810 can calculate that the gain of H^$_{eq}$[7·Δf/4]] is 0.9 times the gain of H^$_{eq}$[3·Δf/4]. Further, similarly for the phase characteristic, the frequency characteristic calculation unit 1810 can calculate a phase difference between the phase of H^$_{eq}$ [3·Δf/4] obtained by subtracting the phase of Z$_k$(3·Δf/4) from the phase of Y~$_i$(3·Δf/4), and the phase of H^$_{eq}$ [7·Δf/4] obtained by subtracting the phase of Z$_k$(7·Δf/4) from the phase of Y~$_i$(7·Δf/4).

Note that in any of (1) and (2) described above, the frequency characteristic calculation unit 1810 may calculate the discrete equivalent frequency characteristic H^$_{eq}$ by using the tones from both of the original spectrum Z$_k$(f) and the conjugate image Z$_{-k}$(f) of the calibration input signal X(f) in the calibration bandpass signal Y~$_i$(f), or may calculate the discrete equivalent frequency characteristic H^$_{eq}$ by using the tone from only any one.

In S1920 of FIG. 19, the interpolation processing unit 1820 estimates the continuous equivalent frequency characteristic H$_{eq}$ by interpolating the discrete equivalent frequency characteristic H^$_{eq}$. When the influence of the PSF input characteristic 1420 is not taken into consideration (in the case of (1) described above), in the present modification example, the interpolation processing unit 1820 interpolates the gain characteristic and the phase characteristic of the discrete equivalent frequency characteristic H^$_{eq}$ calculated at the interval of frequency Δf or Δf/2, and estimates the continuous equivalent frequency characteristic H$_{eq}$. The interpolation processing unit 1820 may use, as the interpolation method, linear interpolation, polynomial interpolation, spline interpolation, or any other method.

When the influence of the PSF input characteristic 1420 is taken into consideration (in the case of (2) described above) as well, similar to the case of (1) described above, the interpolation processing unit 1820 estimates changes of the gain characteristic and the phase characteristic of the equivalent frequency characteristic H$_{eq}$ in each frequency slot according to the changes of the signal strength and the phase between the plurality of tones included in each frequency slot in the calibration bandpass signal Y~$_i$(f). This makes it possible for the interpolation processing unit 1820 to estimate the equivalent frequency characteristic H$_{eq}$ which is discontinuous between the frequency slots, but is continuous in the frequency slot.

Further, the interpolation processing unit 1820 is configured to adjust, at a boundary between a certain frequency slot (denoted as a "first frequency slot") and a frequency slot in a vicinity of the certain frequency slot (shown as a "second frequency slot") that are adjacent to each other in the calibration bandpass signal Y~$_i$(f), the equivalent frequency characteristic H$_{eq}$ on a first frequency slot side, and the equivalent frequency characteristic H$_{eq}$ on a second frequency slot side, to be close to each other. For example, in FIG. 23, it is assumed that by setting, as the first frequency slot, the frequency slot in which the center frequency is 0, the interpolation processing unit 1820 calculates a first equivalent frequency characteristic H$_{eq}$ continuous in the first frequency slot, and a second equivalent frequency characteristic H$_{eq}$ continuous in the second frequency slot in which the center frequency is fp. At this stage, the first equivalent frequency characteristic H$_{eq}$ and the second equivalent frequency characteristic H$_{eq}$ are discontinuous. Therefore, for example, the interpolation processing unit 1820 adjusts the gain characteristic and the phase characteristic of the second equivalent frequency characteristic H$_{eq}$ at the frequency fp/2, which is the boundary between the first and second frequency slots, to match the gain characteristic and the phase characteristic of the first equivalent frequency characteristic H$_{eq}$ at the frequency fp/2, and adjusts, by the same adjustment amount, the gain characteristic and the phase characteristic of another frequency in the second equivalent frequency characteristic H$_{eq}$. The interpolation processing unit 1820 may regard, as the first frequency slot, a frequency slot in which the center frequency is other than 0, and adjust the equivalent frequency characteristics H$_{eq}$ to be closer between the first frequency slot and the second frequency slot adjacent to the first frequency slot.

This makes it possible for the interpolation processing unit 1820 to estimate the continuous equivalent frequency characteristic H$_{eq}$, for example, by adjusting the equivalent frequency characteristic H$_{eq}$ in order from the frequency slot in which the center frequency is 0 to the frequency slot of a high number of the frequency. Note that the interpolation processing unit 1820 may use, as a starting point for this processing, the frequency slot in which the center frequency is other than 0.

In S1930 of FIG. 19, the correction filter determination unit 1830 determines a frequency characteristic H$_C$ of the correction filter 1620 such that the equivalent frequency characteristic H$_{eq}$ can be offset. The correction filter determination unit 1830 is configured to set, for each frequency slot up to the cutoff frequency f$_b$pf of the band limitation in the bandpass filter 140 and the low-pass filter 1610, the frequency characteristic H$_C$ of the correction filter 1620 as a characteristic in accordance with the inverse characteristic of the equivalent frequency characteristic H$_{eq}$ in the frequency slot. Here, the correction filter determination unit 1830 may determine the frequency characteristic H$_C$ of the correction filter 1620 by the following Expression 13.

[Expression 13]

$$H_C(e^{j\omega}) = \frac{1}{H_{eq}(f)H_S(e^{j\omega})} \quad (13)$$

In this way, the calibration processing unit 1590 sets the frequency characteristic Hc(f) as an inverse characteristic of a product of the estimated H$_{eq}$(f) and the known frequency characteristic H$_S$(f) of the low-pass filter 1610. Note that in the present modification example, the calibration bandpass signal Y~$_i$(f) is a signal which has passed through the correction filter unit 1555. Accordingly, in a case where the frequency characteristic He of the correction filter 1620 has been set to a number other than gain 1 and phase 0, the correction filter 1620 may determine a new frequency characteristic He by multiplying the set frequency characteristic H$_C$ by the inverse characteristic of the estimated equivalent frequency characteristic H$_{eq}$(f).

In S1940 of FIG. 19, the correction filter setting unit 1840 calculates the parameter of the correction filter 1620 for the correction filter 1620 to set the determined frequency characteristic H$_C$. For example, when the correction filter 1620 is an FIR (Finite Impulse Response) filter, the correction filter setting unit 1840 calculates each filter coefficient of the FIR filter from the determined frequency characteristic H$_C$. The correction filter setting unit 1840 sets the calculated filter coefficient to the correction filter 1620.

With the conversion device 1500 shown above, the actual frequency characteristic of the bandpass filter 140 or the like of each front end can be compensated by the correction filter unit 1555. Further, with the conversion device 1500, by supplying the calibration input signal shown in FIG. 21 to the converter, it is possible to collectively estimate, over the plurality of frequency slots, the equivalent frequency characteristics He, of a pass which includes the bandpass filters 140 or the like of the respective front ends, and it is possible to set the frequency characteristic of the correction filter 1620 in the correction filter unit 1555 based on the inverse characteristic of the equivalent frequency characteristic $H_{eq}$.

Figure 24:
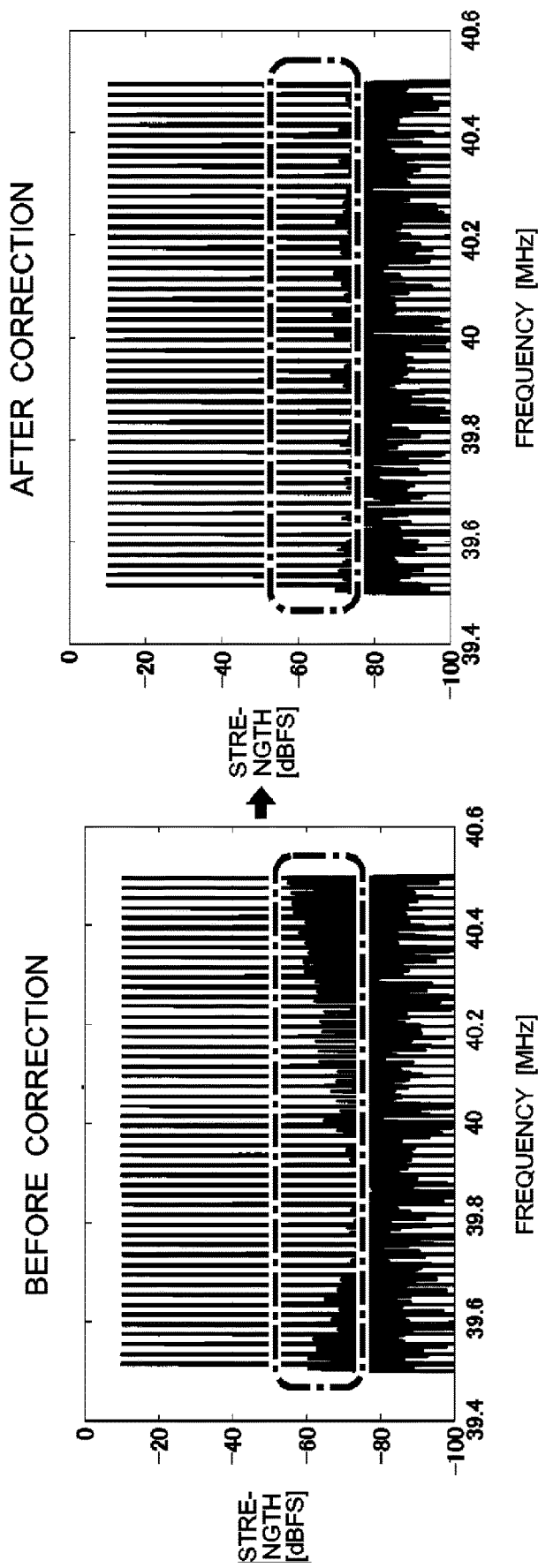
FIG. 24 shows examples of spectrums of output signals before and after a correction according to the modification example of the present embodiment.

FIG. 24 shows examples of spectrums of output signals before and after a correction according to the modification example of the present embodiment. The present drawing shows the result of generating, by the simulation, the spectrum of the output signal xo(t) obtained by reconstructing the calibration input signal $x_{LPF}(t)$ shown in Expression 9 by the conversion device 1500. Note that the number m of the front ends is 4, and the sampling frequency fs of the AD converter 150 is 16 times (q=16) the frequency fp of the signal pattern.

When the correction by the correction filter unit 1555 is not performed, the conjugate image (the spurious) to a degree of −45 dB is generated in the spectrum of the output signal xo(t) according to the actual frequency characteristics of the bandpass filter 140 or the like. In contrast to this, after the correction filter 1620 is calibrated by the calibration processing unit 1590, the conversion device 1500 can suppress the spurious to a degree of −76 dB.

Figure 25:
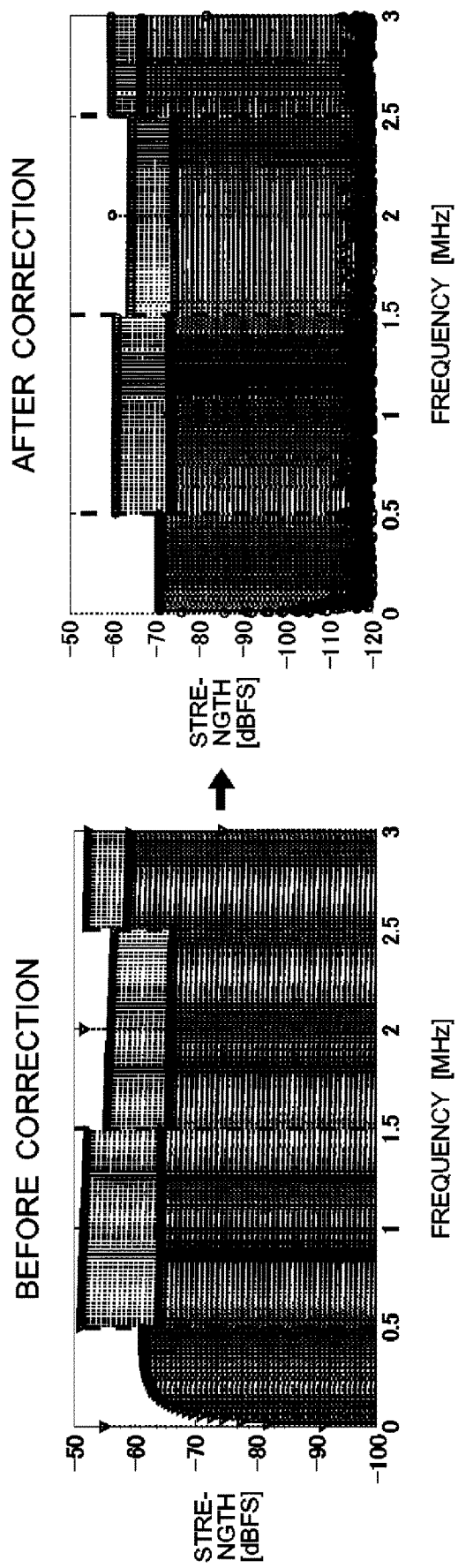
FIG. 25 shows examples of the spectrums of the output signals that are output by the AD converter and the correction filter unit in response to the calibration input signal X(f) being input before and after the correction according to the modification example of the present embodiment.

FIG. 25 shows examples of the spectrums of the output signals that are output by the AD converter 150 and the correction filter unit 1555 in response to the calibration input signal $X_{LPF}(f)$ being input before and after the correction according to the modification example of the present embodiment. The present drawing shows the result of mounting, on board, the circuit of the converter part of the conversion device 1500 and performing the measurement by using the actual circuit. Here, the repetition frequency fp of the signal pattern $p_i(t)$ is 1 MHz, the number of frequency slots $L_0$ is 160, the frequency bandwidth that is a detection target of the input signal x(t) is 160 MHz, and the number of symbols in one cycle of the signal pattern $p_i(t)$ is 500, the number m of the front ends is 4, the sampling frequency fs of the AD converter 150 is 100 MHz, and the cutoff frequency of the bandpass filter 140 is 30 MHz.

When the correction by the correction filter unit 1555 is not performed, as shown on the left side of the present drawing, in the frequency slot with a frequency of 0 to 0.5 MHz, a decrease in the signal strength of the output signal Xo(f) due to the gain decrease of the bandpass filter 140 or the like at a low frequency is observed. Further, also in each of the frequency slots with frequencies of 0.5 to 1.5 MHz, 1.5 to 2.5 MHz, and above 2.5 MHz, the gain gently decreases as the frequency increases.

In contrast to this, the output signal Xo(f) after the correction filter 1620 is calibrated by the calibration processing unit 1590 has a substantially constant signal strength for each frequency slot regardless of the frequency, as shown on the right side of the present drawing. Note that the output signal Xo(f) is obtained by multiplying the different frequency component $c_{i,j}$ for each frequency slot in the signal pattern $P_i(f)$ by the baseband spectrums $Z_k(f)$ of the calibration input signal $X_{LPF}(f)$ and $Z_{-k}(f)$, and thus the boundary of the frequency slot in the output signal Xo(f) is discontinuous.

Figure 26:
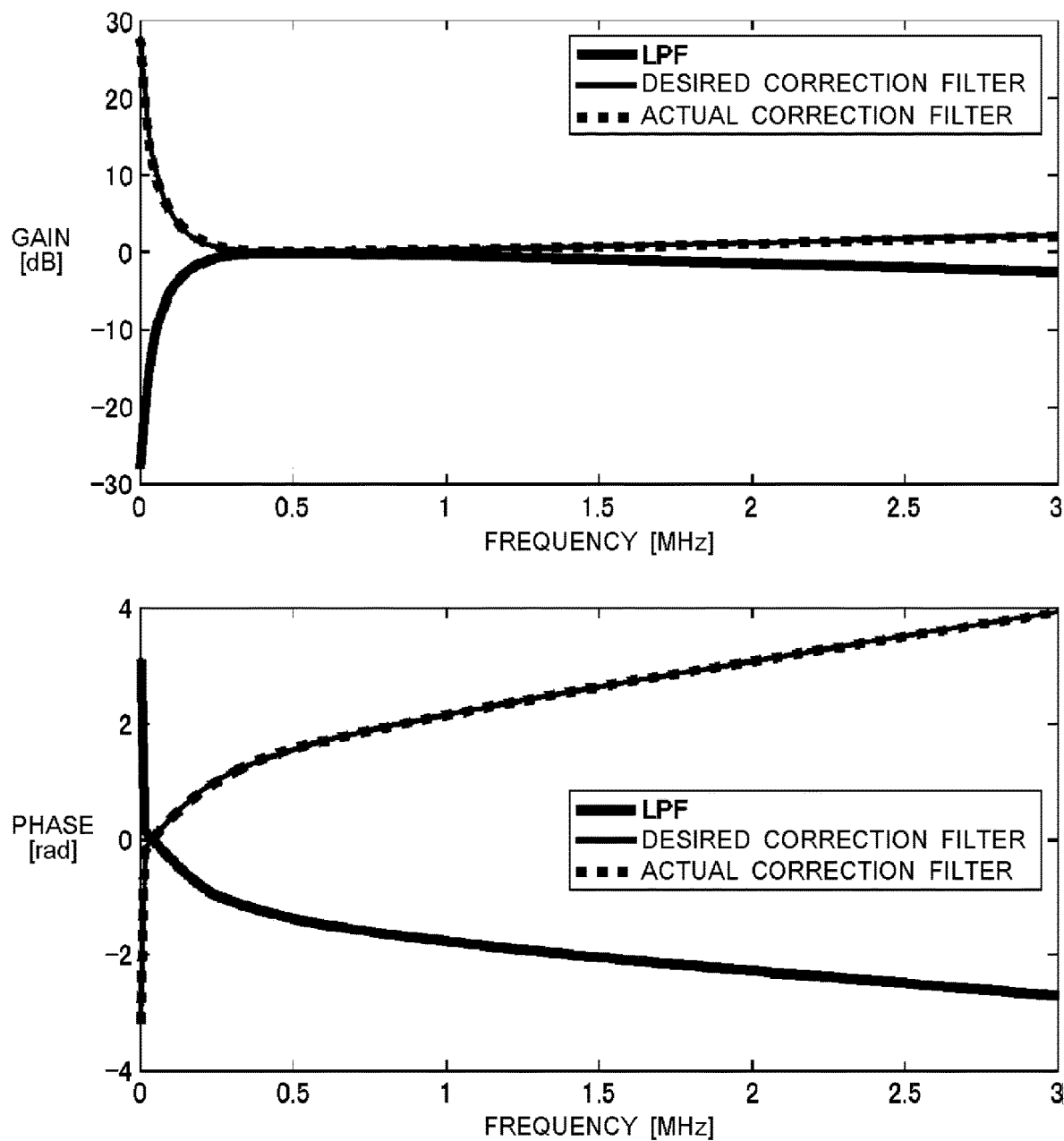
FIG. 26 shows examples of frequency characteristics of the low-pass filter and the correction filter according to the modification example of the present embodiment.

FIG. 26 shows examples of frequency characteristics of the low-pass filter (the LPF) as an example of the bandpass filter 140 and the correction filter 1620 according to the modification example of the present embodiment. In the present drawing, the horizontal axis represents the frequency and the vertical axis represents the gain and the phase, and the present drawing shows the frequency characteristic of the actual bandpass filter 140 (the "LPF" in the drawing), the frequency characteristic of the ideal correction filter 1620 ("the desired correction filter" in the drawing), and the frequency characteristic of the correction filter 1620 determined by the actual conversion device 1500 (the "actual correction filter" in the drawing).

As described in relation to FIG. 25, in the actual bandpass filter 140, the gain decreases at a low frequency of approximately 0.3 MHz or lower. Further, in the actual bandpass filter 140, the gain gently also decreases at a frequency of approximately 0.3 MHz or higher. Further, the actual bandpass filter 140 has different phase characteristics depending on the frequency, as shown in the graph on a lower side of the present drawing.

As shown in the present drawing, the conversion device 1500 according to the present modification example can calibrate the correction filter 1620 to have substantially the same frequency characteristic as the ideal correction filter that offsets the frequency characteristic unique to the actual bandpass filter 140. In this way, in the conversion device 1500 according to the present modification example, when the sampling frequency fs is higher than the repetition frequency of the signal pattern $p_i(t)$, that is, for example, when fs=q·fp (q is an integer exceeding 1) as well, the correction filter 1620 can be adjusted to offset the equivalent frequency characteristic $H_{eq}$ of the bandpass filter 140 or the like over the plurality of frequency slots.

Note that the calibration bandpass signal acquisition unit 180, the calibration signal supply unit 1570, and the calibration processing unit 1590 of the conversion device 1500 may calibrate the reconstruction unit 160 as shown in relation to FIG. 1 to FIG. 11, after calibrating the correction filter 1620 as shown in relation to FIG. 12 to FIG. 26. This makes it possible for the conversion device 1500 to adjust the reconstruction parameters in the reconstruction unit 160 by using the plurality of calibration bandpass signals from the respective front ends having been closer more ideally by the correction filter unit 1555.

Conversely, the calibration bandpass signal acquisition unit 180, the calibration signal supply unit 1570, and the calibration processing unit 1590 of the conversion device 1500 may calibrate the correction filter 1620 as shown in relation to FIG. 12 to FIG. 26, after calibrating the reconstruction unit 160 as shown in relation to FIG. 1 to FIG. 11. As described in relation to FIG. 9, the calibration processing unit 1590 can detect the actual value (the signal strength and the phase) of each frequency component $c_{i,j}$ of the signal pattern $P_i(f)$ at the time of calibrating the reconstruction unit 160. By using the actual value of each frequency component $c_{i,j}$ detected at the time of calibrating the reconstruction unit 160, the calibration processing unit 1590 can estimate the equivalent frequency characteristic $H_{eq}$ in consideration of the influence of the PSF input characteristic 1420 while using the method described in the "(1) when the influence of the PSF input characteristic 1420 is not taken into consideration" in relation to FIG. 23. The calibration processing unit 1590 may further enhance the precision of the correction filter 1620 and the reconstruction unit 160 by repeatedly calibrating the correction filter 1620 and calibrating the reconstruction unit 160.

The calibration processing unit 1590 shown above adjusts both of the gain characteristic and the phase characteristic of the correction filter 1620. Alternatively, the calibration processing unit 1590 may adjust only any one of the gain characteristic and the phase characteristic of the correction filter 1620.

Various embodiments of the present invention may be described with reference to flowcharts and block diagrams, and blocks in the flowcharts and the block diagrams may represent (1) steps of processes in which operations are performed or (2) sections of apparatuses responsible for performing operations. Certain steps and sections may be implemented by dedicated circuitry, programmable circuitry supplied with computer-readable instructions stored on computer-readable media, and/or processors supplied with computer-readable instructions stored on computer-readable media. Dedicated circuitry may include digital and/or analog hardware circuits, or may include integrated circuits (IC) and/or discrete circuits. Programmable circuitry may include reconfigurable hardware circuits including logical AND, OR, XOR, NAND, NOR, and other logical operations, flip-flops, registers, memory elements, etc., such as field-programmable gate arrays (FPGA), programmable logic arrays (PLA), etc.

Computer-readable media may include any tangible device that can store instructions for execution by a suitable device. As a result, the computer-readable medium having instructions stored in the tangible device includes an article of manufacture including instructions which can be executed to create means for performing operations specified in the flowcharts or block diagrams.

Examples of computer-readable media may include an electronic storage medium, a magnetic storage medium, an optical storage medium, an electromagnetic storage medium, a semiconductor storage medium, etc. More specific examples of computer-readable media may include a floppy(registered trademark) disk, a diskette, a hard disk, a random access memory (RAM), a read-only memory (ROM), an erasable programmable read-only memory (EPROM or Flash memory), an electrically erasable programmable read-only memory (EEPROM), a static random access memory (SRAM), a compact disc read-only memory (CD-ROM), a digital versatile disk (DVD), a Blu-ray (registered trademark) disc, a memory stick, an integrated circuit card, etc.

Computer-readable instructions may include assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk(registered trademark), JAVA(registered trademark), C++, etc., and conventional procedural programming languages, such as the "C" programming language or similar programming languages.

Computer-readable instructions may be provided to a processor of a general-purpose computer, special purpose computer, or a programmable data processing apparatus of another computer, etc., or to programmable circuitry, locally or via a local area network (LAN), wide area network (WAN) such as the Internet, etc., so that the computer-readable instructions is executed to create means for performing operations specified in the flowcharts or block diagrams. Examples of processors include computer processors, processing units, microprocessors, digital signal processors, controllers, microcontrollers, etc.

Figure 27:
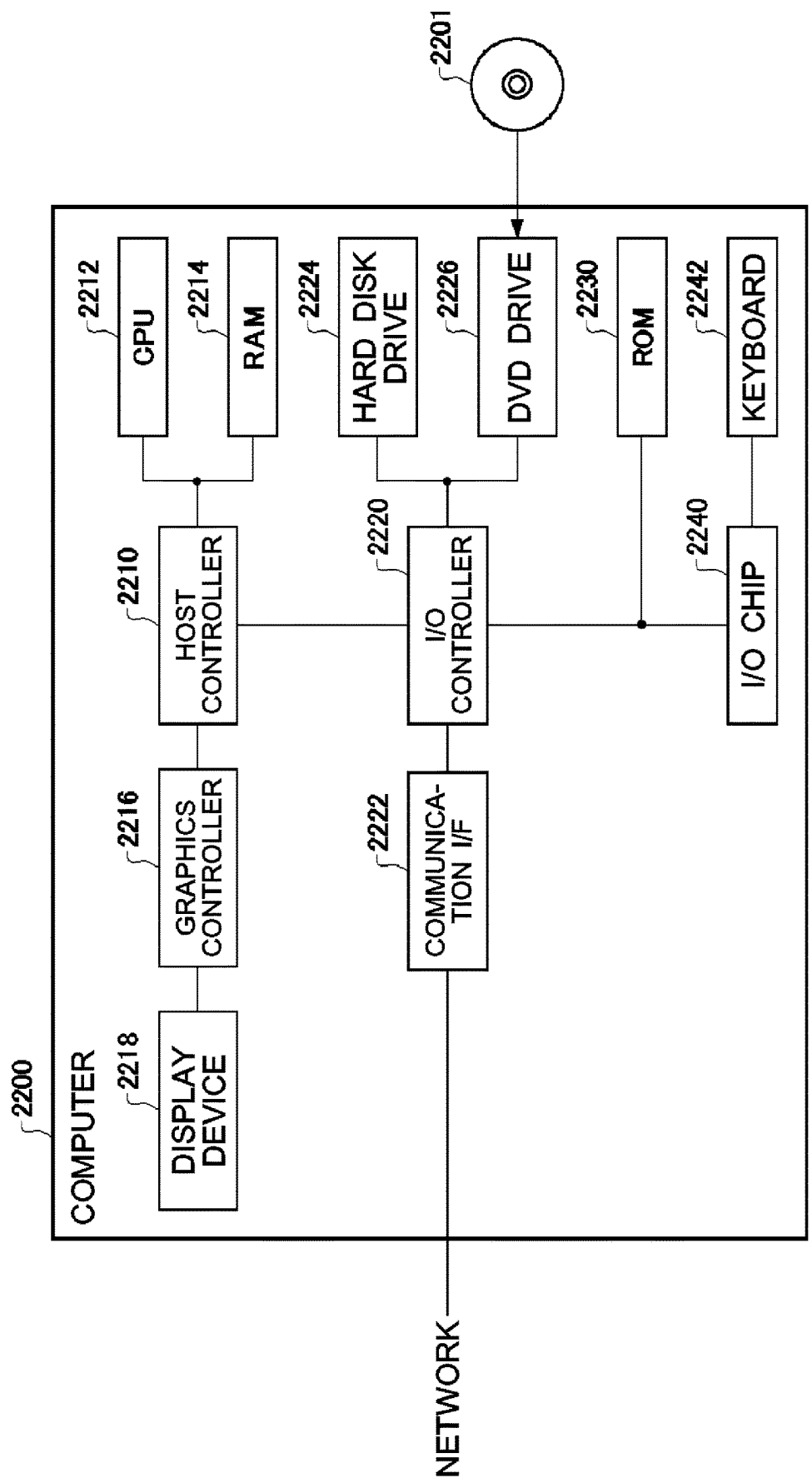
FIG. 27 shows an example of a computer in which a plurality of aspects of the present invention may be embodied entirely or partially.

FIG. 27 shows an example of a computer 2200 in which a plurality of aspects of the present invention may be embodied entirely or partially. A program that is installed on the computer 2200 can cause the computer 2200 to function for operations associated with an apparatus according to the embodiment of the present invention or as one or more sections in the apparatus, or cause the computer 2200 to perform the operations or the one or more sections thereof, and/or cause the computer 2200 to perform processes of the embodiment of the present invention or steps thereof. Such a program may be performed by a CPU 2212 so as to cause the computer 2200 to perform certain operations associated with some or all of the blocks of flowcharts and block diagrams described herein.

The computer 2200 according to the present embodiment includes the CPU 2212, a RAM 2214, a graphics controller 2216, and a display device 2218, which are interconnected by a host controller 2210. The computer 2200 also includes a communication interface 2222, a hard disk drive 2224, a DVD-ROM drive 2226, and an input/output unit such as an IC card drive, which are connected to the host controller 2210 via an input/output controller 2220. The computer also includes a ROM 2230 and a legacy input/output unit such as a keyboard 2242, which are connected to the input/output controller 2220 via an input/output chip 2240.

The CPU 2212 operates according to the programs stored in the ROM 2230 and the RAM 2214, thereby controlling each unit. The graphics controller 2216 acquires image data which is generated, by the CPU 2212, in a frame buffer or the like provided in the RAM 2214 or in itself so as to cause the image data to be displayed on the display device 2218.

The communication interface 2222 communicates with another electronic device via the network. The hard disk drive 2224 stores the program and data used by the CPU 2212 in the computer 2200. The DVD-ROM drive 2226 reads the program or the data from a DVD-ROM 2201, and provides the program or the data to the hard disk drive 2224 via the RAM 2214. The IC card drive reads the program and data from an IC card, and/or writes the program and data to the IC card.

The ROM 2230 stores, in itself, a boot program or the like that is executed by the computer 2200 during activation, and/or a program that depends on hardware of the computer 2200. Further, the input/output chip 2240 may connect various input/output units to the input/output controller 2220 via a parallel port, serial port, keyboard port, mouse port, or the like.

The program is provided by a computer-readable medium such as the DVD-ROM 2201 or the IC card. The program is read from the computer-readable medium, installed on the hard disk drive 2224, the RAM 2214, or the ROM 2230, which is also an example of the computer-readable medium, and executed by the CPU 2212. Information processing written in these programs is read by the computer 2200, resulting in cooperation between a program and various types of hardware resources described above. An apparatus or a method may be constituted by realizing the operation or processing of information in accordance with the usage of the computer 2200.

For example, when a communication is executed between the computer 2200 and an external device, the CPU 2212 may execute a communication program loaded in the RAM 2214, and instruct the communication interface 2222 to process the communication based on the processing written in the communication program. Under the control of the CPU 2212, the communication interface 2222 reads transmission data stored in a transmission buffering region provided in a recording medium such as the RAM 2214, the hard disk drive 2224, the DVD-ROM 2201, or the IC card, transmits the read transmission data to the network, or writes received data which is received from the network to a reception buffering region or the like provided on the recording medium.

Further, the CPU 2212 may cause all or a necessary portion of a file or a database to be read into the RAM 2214, the file or the database having been stored in an external recording medium such as the hard disk drive 2224, the DVD-ROM drive 2226 (DVD-ROM 2201), the IC card, etc., and perform various types of processing on the data on the RAM 2214. Then, the CPU 2212 writes back the processed data to the external recording medium.

Various types of information such as various types of programs, data, tables, and databases may be stored in recording media to undergo information processing. The CPU 2212 may execute various types of processing on the data read from the RAM 2214 to write back a result to the RAM 2214, the processing being described throughout the present disclosure, specified by an instruction sequence of the programs, and including various types of operations, processing of information, condition determinations, conditional branch, unconditional branch, information retrievals/replacements, or the like. Further, the CPU 2212 may search for information in the file, the database, or the like in the recording medium. For example, when a plurality of entries each having an attribute value of a first attribute associated with an attribute value of a second attribute are stored in the recording medium, the CPU 2212 may search, from among the plurality of entries, for an entry matching a condition in which the attribute value of the first attribute is specified, and read the attribute value of the second attribute stored in the entry, thereby acquiring the attribute value of the second attribute associated with the first attribute that satisfies a predetermined condition.

The program or software module described above may be stored on the computer 2200 or in a computer-readable medium near the computer 2200. Further, a recording medium such as a hard disk or a RAM provided in a server system connected to a dedicated communication network or the Internet can be used as the computer-readable medium, thereby providing the program to the computer 2200 via the network.

While the embodiments of the present invention have been described, the technical scope of the invention is not limited to the above-described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCES

100 conversion device, 110 selector, 120 periodic signal generator, 130 mixer, 140 bandpass filter, 150 AD converter, 160 reconstruction unit, 170 calibration signal supply unit, 180 calibration bandpass signal acquisition unit, 190 calibration processing unit, 310 signal, 320 signal, 1000 calibration signal supply unit, 1010 trigger generator, 1020 sine wave generator, 1030 attenuator, 1040 multiplexer, 1050 phase amplitude setting unit, 1100 calibration processing unit, 1110 signal component detection unit, 1120 calibration parameter calculation unit, 1400 ideal mixer, 1410 signal input characteristic, 1420 PSF input characteristic, 1430 mixer output characteristic, 1440 ideal AD converter, 1450 AD conversion characteristic, 1500 conversion device, 1555 correction filter unit, 1570 calibration signal supply unit, 1590 calibration processing unit, 1600 upsampler, 1610 low-pass filter, 1620 correction filter, 1630 downsampler, 1810 frequency characteristic calculation unit, 1820 interpolation processing unit, 1830 correction filter determination unit, 1840 correction filter setting unit, 2200 computer, 2201 DVD-ROM, 2210 host controller, 2212 CPU, 2214 RAM, 2216 graphics controller, 2218 display device, 2220 input/output controller, 2222 communication interface, 2224 hard disk drive, 2226 DVD-ROM drive, 2230 ROM, 2240 input/output chip, 2242 keyboard

What is claimed is:

1. A calibration device comprising:
  a calibration signal supply unit configured to supply, as a calibration input signal, a multitone signal having tones at a plurality of frequencies to a converter configured to multiply an input signal by each of a plurality of signal patterns and limit a band to obtain each of a plurality of bandpass signals, and reconstruct an output signal in accordance with the input signal from the plurality of bandpass signals;
  a calibration bandpass signal acquisition unit configured to acquire a plurality of calibration bandpass signals obtained by the converter in response to the calibration input signal; and
  a calibration processing unit configured to calibrate, based on each of the plurality of calibration bandpass signals, a correction filter configured to correct each of the plurality of bandpass signals.

2. The calibration device according to claim 1, wherein in a frequency slot which has, as a center frequency, a frequency that is an integer multiple of a repetition frequency of the plurality of signal patterns, and which has a width of the repetition frequency, the calibration input signal has a tone at each of the plurality of frequencies arranged asymmetrically with respect to the center frequency.

3. The calibration device according to claim 2, wherein each tone of the calibration input signal has a frequency in which no other tone of the calibration input signal exists at a frequency which is symmetric with respect to a frequency of the tone with the center frequency as a center.

4. The calibration device according to claim 3, wherein each tone of the calibration input signal is arranged in the frequency slot at a predetermined frequency interval.

5. The calibration device according to claim 3, wherein each tone of the calibration input signal has a same signal strength.

6. The calibration device according to claim 3, wherein the calibration processing unit is configured to
  estimate, according to a change of a signal strength between a plurality of tones included in one frequency slot in a first calibration bandpass signal, a frequency characteristic in at least a part of a pass until the first calibration bandpass signal is obtained from a first calibration input signal, in the one frequency slot, and calibrate the correction filter configured to correct the first calibration bandpass signal, to a characteristic in accordance with an inverse characteristic of the frequency characteristic in the one frequency slot.

7. The calibration device according to claim 2, wherein each tone of the calibration input signal is arranged in the frequency slot at a predetermined frequency interval.

8. The calibration device according to claim 7, wherein each tone of the calibration input signal has a same signal strength.

9. The calibration device according to claim 7, wherein the calibration processing unit is configured to estimate, according to a change of a signal strength between a plurality of tones included in one frequency slot in a first calibration bandpass signal, a frequency characteristic in at least a part of a pass until the first calibration bandpass signal is obtained from a first calibration input signal, in the one frequency slot, and calibrate the correction filter configured to correct the first calibration bandpass signal, to a characteristic in accordance with an inverse characteristic of the frequency characteristic in the one frequency slot.

10. The calibration device according to claim 2, wherein each tone of the calibration input signal has a same signal strength.

11. The calibration device according to claim 2, wherein the calibration processing unit is configured to estimate, according to a change of a signal strength between a plurality of tones included in one frequency slot in a first calibration bandpass signal, a frequency characteristic in at least a part of a pass until the first calibration bandpass signal is obtained from a first calibration input signal, in the one frequency slot, and calibrate the correction filter configured to correct the first calibration bandpass signal, to a characteristic in accordance with an inverse characteristic of the frequency characteristic in the one frequency slot.

12. The calibration device according to claim 11, wherein the calibration processing unit is configured to calibrate the correction filter configured to correct the first calibration bandpass signal, to set, for each frequency slot up to a cutoff frequency of the band limitation, a characteristic in accordance with an inverse characteristic of the frequency characteristic in the frequency slot.

13. The calibration device according to claim 12, wherein the calibration processing unit is configured to adjust, at a boundary between a first frequency slot and a second frequency slot that are adjacent to each other in the first calibration bandpass signal, the frequency characteristic of the pass on a side of the first frequency slot and the frequency characteristic of the pass on a side of the second frequency slot, to be close to each other.

14. The calibration device according to claim 11, wherein the calibration processing unit is configured to adjust, at a boundary between a first frequency slot and a second frequency slot that are adjacent to each other in the first calibration bandpass signal, a frequency characteristic of the pass on a side of the first frequency slot and the frequency characteristic of the pass on a side of the second frequency slot, to be close to each other.

15. A conversion device comprising:

a converter configured to multiply an input signal by each of a plurality of signal patterns and limit a band to obtain each of a plurality of bandpass signals, and reconstruct an output signal in accordance with the input signal from the plurality of bandpass signals; and the calibration device according to claim 2.

16. A conversion device comprising:

a converter configured to multiply an input signal by each of a plurality of signal patterns and limit a band to obtain each of a plurality of bandpass signals, and reconstruct an output signal in accordance with the input signal from the plurality of bandpass signals; and the calibration device according to claim 1.

17. The conversion device according to claim 16, wherein the converter includes a plurality of mixers configured to multiply the input signal by each of the plurality of signal patterns, a plurality of bandpass filters configured to respectively limit bands of a plurality of signals that are output by the plurality of mixers;

a plurality of AD converters configured to output the plurality of bandpass signals obtained by respectively sampling signals that have passed through the plurality of bandpass filters;

a plurality of correction filter units configured to output a plurality of correction bandpass signals obtained by respectively correcting the plurality of bandpass signals; and a reconstruction unit configured to reconstruct the output signal from the plurality of correction bandpass signals.

18. The conversion device according to claim 17, wherein each of the plurality of correction filter units includes a low-pass filter configured to perform low-pass filtering of passing a bandpass signal that is input to the correction filter unit among the plurality of bandpass signals, and a correction filter configured to correct a bandpass signal that has passed through the low-pass filter.

19. A calibration method comprising:

supplying, as a calibration input signal, a multitone signal having tones at a plurality of frequencies to a converter configured to multiply an input signal by each of a plurality of signal patterns and limit a band to obtain each of a plurality of bandpass signals, and reconstruct an output signal in accordance with the input signal from the plurality of bandpass signals;

acquiring a plurality of calibration bandpass signals obtained by the converter in response to the calibration input signal; and calibrating, based on each of the plurality of calibration bandpass signals, a correction filter configured to correct each of the plurality of bandpass signals.

20. A non-transitory computer-readable medium having recorded thereon a calibration program that is executed by a computer and causes the computer to function as:

a calibration signal supply unit configured to supply, as a calibration input signal, a multitone signal having tones at a plurality of frequencies to a converter configured to multiply an input signal by each of a plurality of signal patterns and limit a band to obtain each of a plurality of bandpass signals, and reconstruct an output signal in accordance with the input signal from the plurality of bandpass signals;

a calibration bandpass signal acquisition unit configured to acquire a plurality of calibration bandpass signals obtained by the converter in response to the calibration input signal; and a calibration processing unit configured to calibrate, based on each of the plurality of calibration bandpass signals, a correction filter configured to correct each of the plurality of bandpass signals.

\* \* \* \* \*